US011392329B1

(12) United States Patent
Tylik et al.

(10) Patent No.: US 11,392,329 B1
(45) Date of Patent: Jul. 19, 2022

(54) UNIFORM HOST ATTACHMENT

(71) Applicant: EMC IP Holding Company LLC, Hopkinton, MA (US)

(72) Inventors: Dmitry Tylik, Westborough, MA (US); Dave J. Lindner, Nashua, NH (US); Carole Ann Gelotti, Hollis, NH (US); Matthew Long, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/229,131

(22) Filed: Apr. 13, 2021

(51) Int. Cl.
 *G06F 3/06* (2006.01)
(52) U.S. Cl.
 CPC .......... *G06F 3/0659* (2013.01); *G06F 3/0604* (2013.01); *G06F 3/065* (2013.01); *G06F 3/067* (2013.01); *G06F 3/0635* (2013.01); *G06F 3/0683* (2013.01)
(58) Field of Classification Search
 CPC .... G06F 3/0659; G06F 3/0604; G06F 3/0635; G06F 3/065; G06F 3/067; G06F 3/0683
 See application file for complete search history.

(56) References Cited

U.S. PATENT DOCUMENTS

| 9,176,902 | B1 | 11/2015 | Long et al. | |
| 9,411,819 | B1 | 8/2016 | Long | |
| 9,661,078 | B1 | 5/2017 | Long | |
| 9,971,709 | B1 | 5/2018 | Long et al. | |
| 10,564,863 | B2 * | 2/2020 | Kass | G06F 3/0617 |
| 11,089,105 | B1 * | 8/2021 | Karumbunathan | G06F 3/067 |
| 2019/0310925 | A1 * | 10/2019 | Yoshida | G06F 3/065 |

OTHER PUBLICATIONS

Purity ActiveCluster Demo, Oct. 23, 2017, Pure Storage, https://www.youtube.com/watch?v=SfMjeLpkueM, time mark 3:59.

* cited by examiner

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

Two data storage systems, DS1 and DS2, may be initially configured with identifiers for target ports and target port groups. Subsequently, the two system may be combined into a cluster including a stretched volume configured from the volumes V1 and V2, respectively, on DS1 and DS2, where V1 and V2 are exposed to the host as the same logical volume, L1, over multiple paths from DS1 and DS2 to the host. V1 may have a normal attribute indicating target ports and port groups of DS1 have associated identifiers as specified in an initial configuration when reporting information regarding L1 to the host. V2 may have an extended attribute indicating that target ports and port groups of DS2 have associated extended identifiers determined using a first extended value and using identifiers from an initial configuration when reporting information regarding L1 to the host.

20 Claims, 19 Drawing Sheets

Information reported for the LUN C

| Physical TPG: | TPG A | TPG B | TPG C | TPG D | TPG E | TPG F | TPG G | TPG H |
|---|---|---|---|---|---|---|---|---|
| TPG ID: | 0001 | 0002 | 0003 | 0004 | 0001 | 0002 | 0003 | 0004 |
| Target Port ID Range: | 0021-0030 | 0031-0040 | 0041-0050 | 0051-0060 | 0021-0030 | 0031-0040 | 0041-0050 | 0051-0060 |
| Path State: | No path 532a | No path 532b | No path 532c | No path 532d | Active non-opt 532e | Active Opt 532f | No Path 532g | No Path 532h |

FIG. 8C

Information reported for LUN A

| Physical TPG: | TPG A | TPG B | TPG C | TPG D | TPG E | TPG F | TPG G | TPG H |
|---|---|---|---|---|---|---|---|---|
| TPG ID: | 0001 | 0002 | 0003 | 0004 | F001 | F002 | F003 | F004 |
| Target Port ID Range: | 0021-0030 | 0031-0040 | 0041-0050 | 0051-0060 | F021-F030 | F031-F040 | F041-F050 | F051-F060 |
| Path State: | No path 532a | No path 532b | No path 532c | No path 532d | No path 532e | No path 532f | Active Opt 532g | Active non opt 532h |

FIG. 9B

Information reported for LUN A

| Physical TPG: | TPG I | TPG J | TPG K | TPG L | TPG E | TPG F | TPG G | TPG H |
|---|---|---|---|---|---|---|---|---|
| TPG ID: | 0001 | 0002 | 0003 | 0004 | F001 | F002 | F003 | F004 |
| Target Port ID Range: | 0021-0030 | 0031-0040 | 0041-0050 | 0051-0060 | F021-F030 | F031-F040 | F041-F050 | F051-F060 |
| Path State: | Active non opt 532i | Active non opt 532j | No path 532k | No path 532l | No path 532e | No path 532f | Active Opt 532g | Active non opt 532h |

FIG. 10B

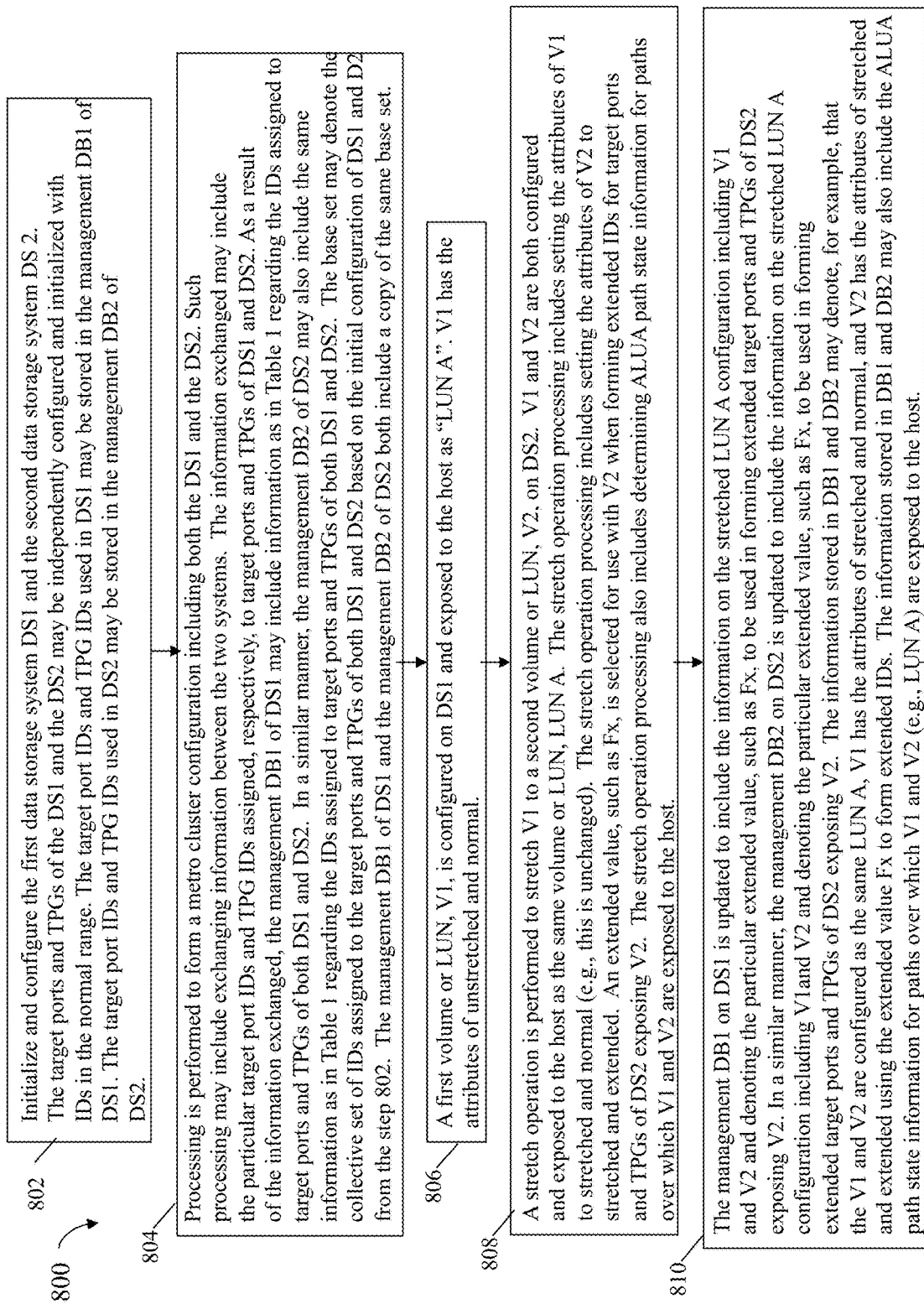

802 — Initialize and configure the first data storage system DS1 and the second data storage system DS 2. The target ports and TPGs of the DS1 and the DS2 may be independently configured and initialized with IDs in the normal range. The target port IDs and TPG IDs assigned, respectively, to target ports and TPGs used in DS1 may be stored in the management DB1 of DS1. The target port IDs and TPG IDs used in DS2 may be stored in the management DB2 of DS2.

804 — Processing is performed to form a metro cluster configuration including both the DS1 and the DS2. Such processing may include exchanging information between the two systems. The information exchanged may include the particular target port IDs and TPG IDs assigned, respectively, to target ports and TPGs of DS1 and DS2. As a result of the information exchanged, the management DB1 of DS1 may include information as in Table 1 regarding the IDs assigned to target ports and TPGs of both DS1 and DS2. In a similar manner, the management DB2 of DS2 may also include the same information as in Table 1 regarding the IDs assigned to target ports and TPGs of both DS1 and DS2. The base set may denote the collective set of IDs assigned to the target ports and TPGs of both DS1 and DS2 based on the initial configuration of DS1 and D2 from the step 802. The management DB1 of DS1 and the management DB2 of DS2 both include a copy of the same base set.

806 — A first volume or LUN, V1, is configured on DS1 and exposed to the host as "LUN A". V1 has the attributes of unstretched and normal.

808 — A stretch operation is performed to stretch V1 to a second volume or LUN, V2, on DS2. V1 and V2 are both configured and exposed to the host as the same volume or LUN, LUN A. The stretch operation processing includes setting the attributes of V1 to stretched and normal (e.g., this is unchanged). The stretch operation processing includes setting the attributes of V2 to stretched and extended. An extended value, such as Fx, is selected for use with V2 when forming extended IDs for target ports and TPGs of DS2 exposing V2. The stretch operation processing also includes determining ALUA path state information for paths over which V1 and V2 are exposed to the host.

810 — The management DB1 on DS1 is updated to include the information on the stretched LUN A configuration including V1 and V2 and denoting the particular extended value, such as Fx, to be used in forming extended target ports and TPGs of DS2 exposing V2. In a similar manner, the management DB2 on DS2 is updated to include the information on the stretched LUN A configuration including V1 and V2 and denoting the particular extended value, such as Fx, to be used in forming extended target ports and TPGs of DS2 exposing V2. The information stored in DB1 and DB2 may denote, for example, that the V1 and V2 are configured as the same LUN A, V1 has the attributes of stretched and normal, and V2 has the attributes of stretched and extended using the extended value Fx to form extended IDs. The information stored in DB1 and DB2 may also include the ALUA path state information for paths over which V1 and V2 (e.g., LUN A) are exposed to the host.

 A

FIG. 11A

818 — Unstretch LUN A by removing V1 on DS1 and leaving V2. The unstretch operation may include updating attributes of V2 to be unstretched and extended (e.g., this attribute is unchanged). Update the management DB1 and DB2, respectively, for DS1 and DS2 based on the unstretch operation.

820 — Restretch LUN A from V2 on DS2 to V3 on a third data storage system DS3. The restretching may be accomplished using the stretch operation applied to V2 to stretch and extend the LUN A to include V3.
V2 and V3 are both configured and exposed to the host as the same volume or LUN A. The stretch operation processing includes setting the attributes of V2 to stretched and extended (e.g., this is unchanged). The stretch operation processing includes setting the attributes of V3 to stretched and normal. The selected extended value, such as Fx, is selected for use with V2 when forming extended IDs for target ports and TPGs of DS2 exposing V2. The stretch operation processing also includes determining ALUA path state information for paths over which V2 and V3 are exposed to the host.

822 — The management DB2 on DS2 is updated to include the information on the stretched LUN A configuration including V2 and V3 and denoting the particular extended value, such as Fx, to be used in forming extended target ports and TPGs of DS2 exposing V2. The management DB3 on DS3 is updated to include the information on the stretched LUN A configuration including V3 and V2 and denoting the particular extended value, such as Fx, to be used in forming extended target ports and TPGs of DS2 exposing V2. The information stored in DB3 and DB2 may denote, for example, that the V3 and V2 are configured as the same LUN A, V3 has the attributes of stretched and normal, and V2 has the attributes of stretched and extended using the extended value Fx to form extended IDs. The information stored in DB3 and DB2 may also include the ALUA path state information for paths over which V3 and V2 (e.g., LUN A) are exposed to the host.

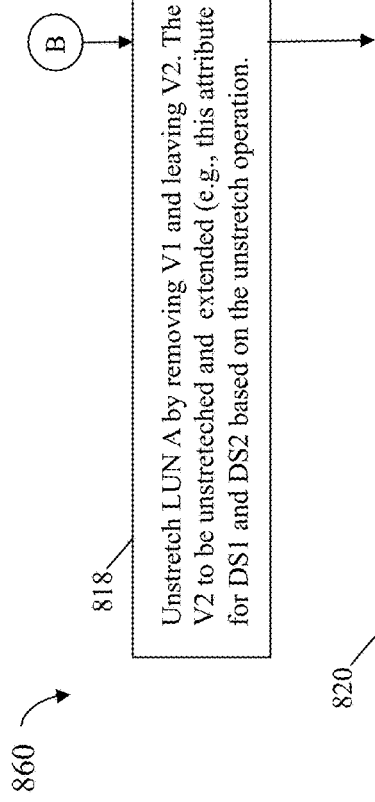

FIG. 11C under represents the UN I FORM HOST ATTACHMENT

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for exposing volumes to hosts comprising: configuring a first data storage system, DS1, with a first identifier set of target port identifiers and target port group identifiers; configuring a second data storage system, DS2, with a second identifier set of target port identifiers and target port group identifiers; performing a stretch operation to configure a stretched volume using a first volume, V1, on DS1 and a second volume V2 on a second data storage system, DS2, wherein V1 and V2 are configured as a same logical volume, L1, and exposed to the host as the same logical volume, L1, over a plurality of paths including a first path, P1, and a second path, P2, wherein P1 is between the host and DS1, and wherein P2 is between the host and DS2, wherein V1 has a normal attribute indicating that target ports and target port groups of DS1 have associated identifiers as specified in the first identifier set when reporting information regarding L1 to the host, wherein V2 has an extended attribute indicating that target ports and target port groups of DS2 have associated extended identifiers determined using the second identifier set and a first extended value when reporting information regarding L1 to the host; and reporting first information to the host regarding L1, wherein the first information comprises a third identifier set including target port identifiers and target port group identifiers of the first identifier set over which V1 is exposed to the host, wherein the first information comprises a fourth identifier set including extended target port identifiers and extended target port group identifiers over which V2 is exposed to the host, wherein each of the extended target port identifiers and each of the extended target port group identifiers includes a first portion of bits having a first value based on a corresponding identifier from the second identifier set and includes a second portion of reserved bits having a second value equal to the first extended value.

In at least one embodiment, each of the target port identifiers in the first identifier set, the second identifier set and the third identifier set may be included in a normal identifier range of values, and each of the target port group identifiers of the first identifier set, the second identifier set and the third identifier set may be included in a normal identifier range of values. Each of the extended target port identifiers of the fourth identifier set and each of the extended target port group identifiers of the fourth identifier set may be included in an extended identifier range of values that does not overlap with the normal identifier range of values.

In at least one embodiment, processing may include issuing, from the host to one of DS1 and DS2, a command requesting the first information regarding L1, wherein the command is issued on one of the plurality of paths over which L1 is exposed to the host, and wherein said reporting first information to the host regarding L1 is performed in response to receiving the command from the host. The first identifier set and the second identifier set may each include a same first target port identifier and each include a same first target port group identifier. Each target port identifier of the third identifier set may be unique with respect to all target port identifiers of the third identifier set and the fourth identifier set. Each target port identifier of the fourth identifier set may be unique with respect to all target port identifiers of the third identifier set and the fourth identifier set. Each target port group identifier of the third identifier set may be unique with respect to all target port group identifiers of the third identifier set and the fourth identifier set. Each target port group identifier of the fourth identifier set may be unique with respect to all target port group identifiers of the third identifier set and the fourth identifier set.

In at least one embodiment, the first information may include access path state information for each path over L1 is exposed to the host, wherein the access path state information may indicate that P1 is active optimized for L1, and P2 is active non-optimized for L1. Processing may include: selecting, by the host, a particular path over which to send an I/O operation directed to L1, wherein said selecting selects P1 as the particular path rather than P2 since P1 is active optimized and P2 is active non-optimized; and sending the I/O operation directed to L1 over the first path from the host to DS1. V1 and V2 may be configured for synchronous replication of writes from V1 to V2, and synchronous replication of writes from V2 to V1.

In at least one embodiment, processing may include performing an unstretch operation to unstretch L1, wherein unstretching L1 may include deleting V1 from DS1 and attributes of V2 to indicate that V2 is unstretched. A third data storage system, DS3, may be configured with a fifth identifier set of target port identifiers and target port group identifiers. Processing may include: performing a second stretch operation to configure a stretched volume using V2 on DS2 and a third volume, V3, on DS3, wherein V3 and V2 are configured as the same logical volume, L1, and exposed to the host as the same logical volume, L1, over a plurality of paths including P2 and a third path, P3, wherein P3 is between the host and DS3, and wherein V3 has the normal attribute indicating that target ports and target port groups of DS3 have associated identifiers as specified in the fifth identifier set when reporting information regarding L1 to the host, wherein V2 has the extended attribute indicating that target ports and target port groups of DS2 have associated extended identifiers determined using the second identifier set and the first extended value when reporting information regarding L1 to the host; and reporting second information to the host regarding L1, wherein the second information comprises a sixth identifier set including target port identifiers and target port group identifiers of the fifth identifier set over which V3 is exposed to the host, wherein the second information comprises the fourth identifier set including extended target port identifiers and extended target port group identifiers over which V2 is exposed to the host.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8A-8C is an example illustrating volumes or LUN along with identifiers and paths states associated with unstretched and stretched volumes or LUNs in an embodiment in accordance with the techniques herein.

FIGS. 9A-9B is an example illustrating an unstretch operation in an embodiment in accordance with the techniques herein.

FIGS. 10A-10B is an example illustrating a restretch operation in an embodiment in accordance with the techniques herein.

FIGS. 11A-C are flowcharts of processing steps that may be performed in an embodiment in accordance with the techniques herein.

DETAILED DESCRIPTION OF EMBODIMENT(S)

Figure 1:
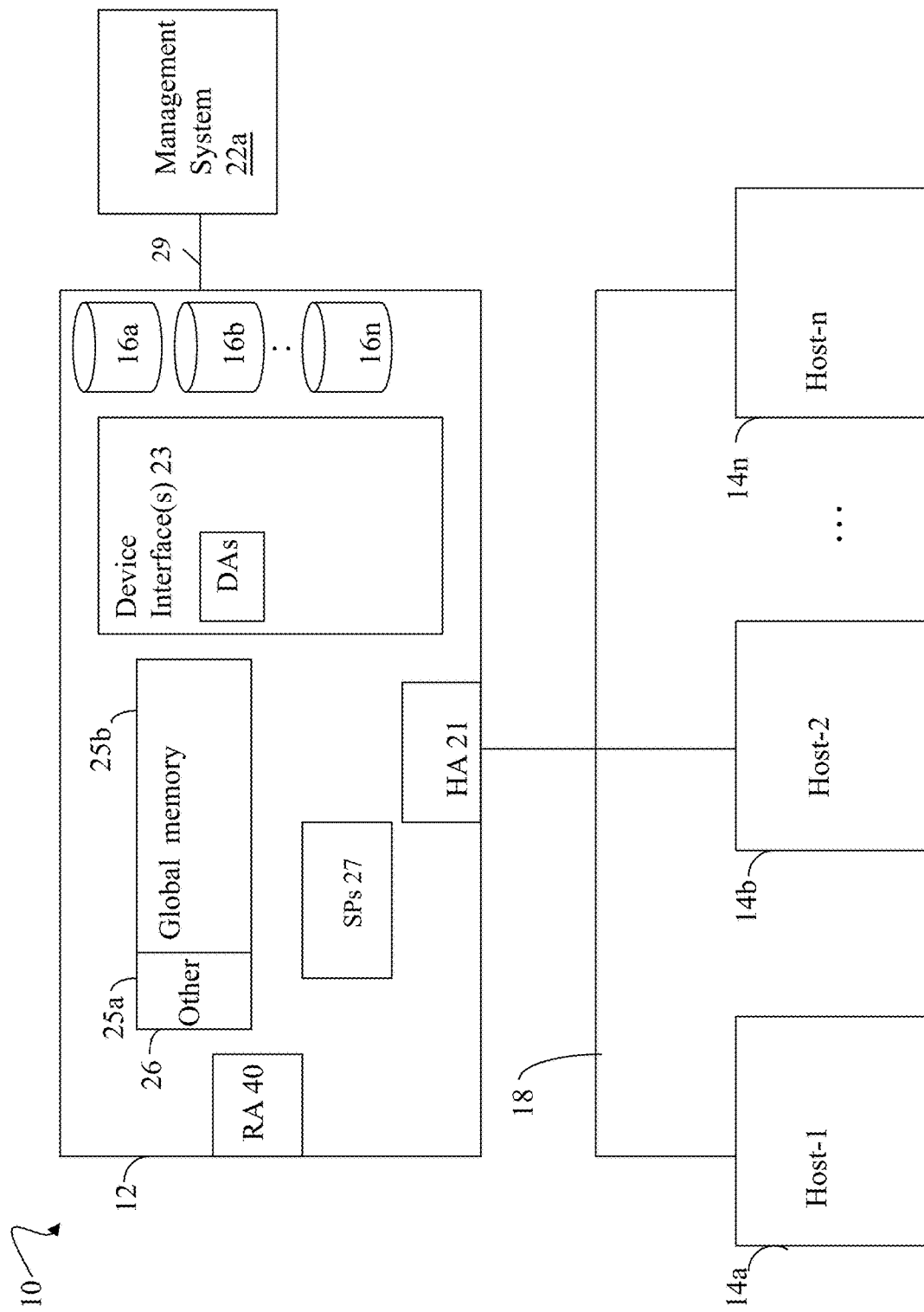
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
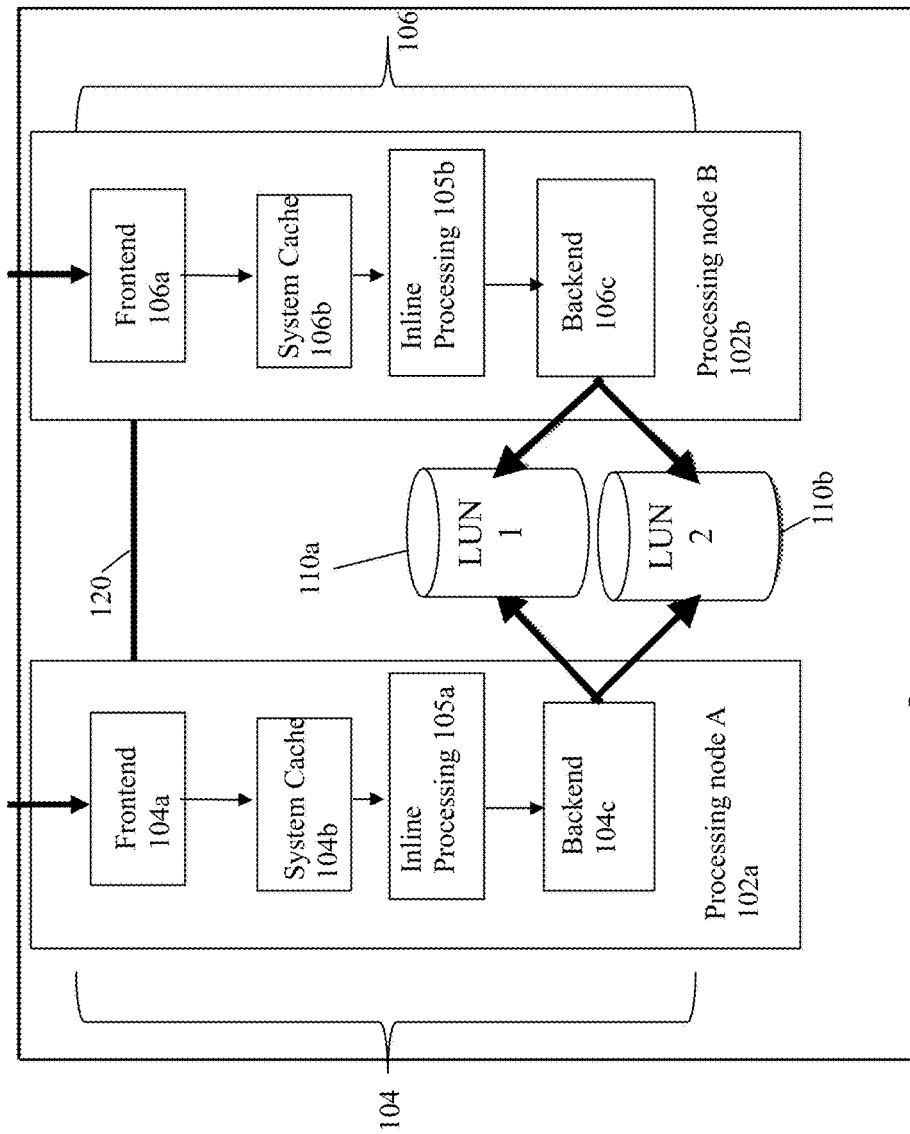
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Data replication is one of the data services that may be performed on a data storage system in an embodiment in accordance with the techniques herein. In at least one data storage system, remote replication is one technique that may be used in connection with providing for disaster recovery (DR) of an application's data set. The application, such as executing on a host, may write to a production or primary data set of one or more LUNs on a primary data storage system. Remote replication may be used to remotely replicate the primary data set of LUNs to a second remote data storage system. In the event that the primary data set on the primary data storage system is destroyed or more generally unavailable for use by the application, the replicated copy of the data set on the second remote data storage system may be utilized by the host. For example, the host may directly access the copy of the data set on the second remote system.

As an alternative, the primary data set of the primary data storage system may be restored using the replicated copy of the data set, whereby the host may subsequently access the restored data set on the primary data storage system. A remote data replication service or facility may provide for automatically replicating data of the primary data set on a first data storage system to a second remote data storage system in an ongoing manner in accordance with a particular replication mode, such as a synchronous mode described elsewhere herein.

Figure 3:
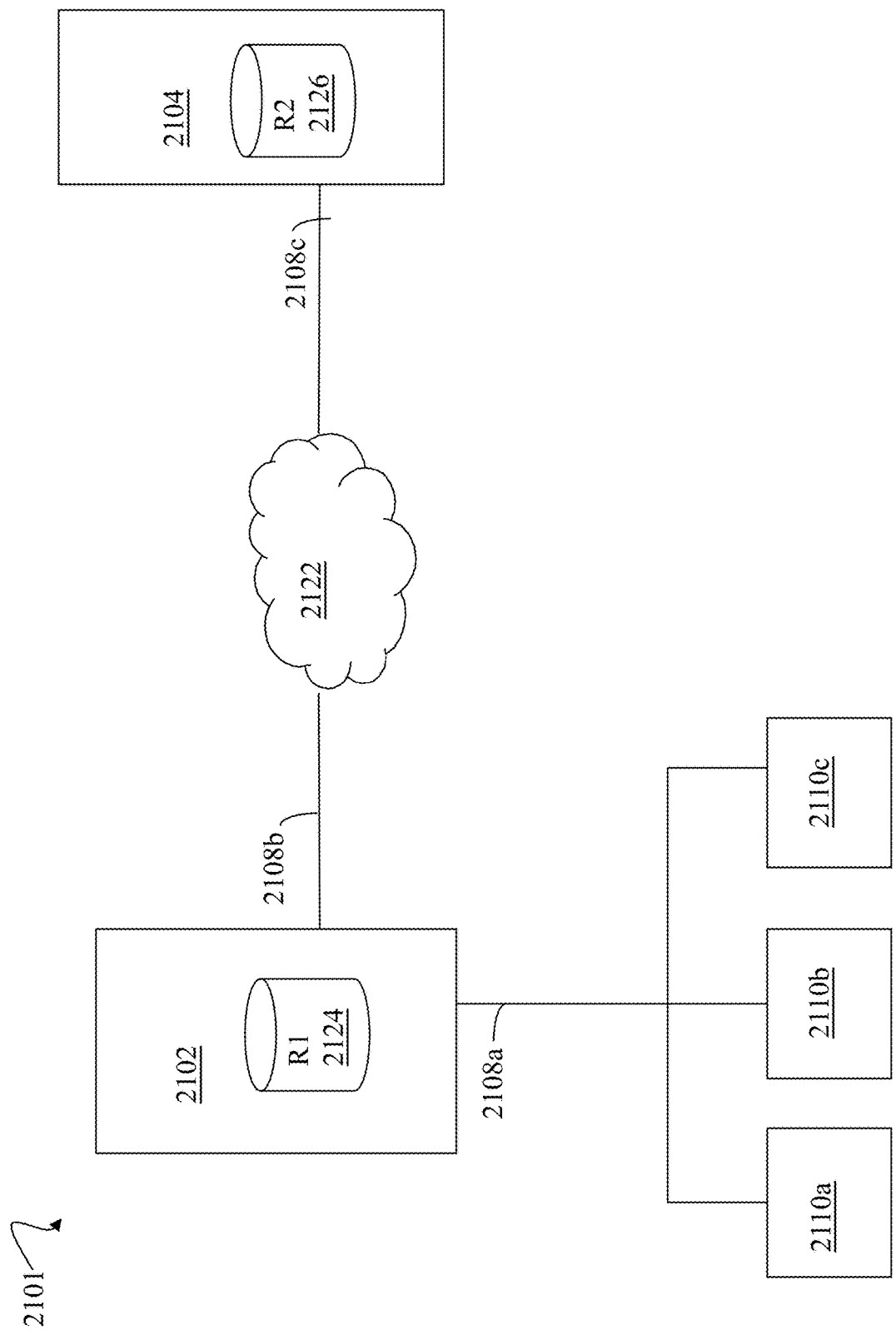
FIG. 3 is an example of systems that may be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 may be remotely connected and communicate over the network 2122, such as the Internet or other private network, and facilitate communications with the components connected thereto. The hosts 2110a, 2110b and 2110c may perform operations to the data storage system 2102 over the connection 2108a. The hosts 2110a, 2110b and 2110c may be connected to the data storage system 2102 through the connection 2108a which may be, for example, a network or other type of communication connection.

The data storage systems 2102 and 2104 may include one or more devices. In this example, the data storage system 2102 includes the storage device R1 2124, and the data storage system 104 includes the storage device R2 2126. Both of the data storage systems 2102, 2104 may include one or more other logical and/or physical devices. The data storage system 2102 may be characterized as local with respect to the hosts 2110a, 2110b and 2110c. The data storage system 104 may be characterized as remote with respect to the hosts 2110a, 2110b and 2110c. The R1 and R2 devices may be configured as LUNs.

The host 1210a may issue a command, such as to write data to the device R1 of the data storage system 2102. In some instances, it may be desirable to copy data from the storage device R1 to another second storage device, such as R2, provided in a different location so that if a disaster occurs that renders R1 inoperable, the host (or another host) may resume operation using the data of R2. With remote replication, a user may denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 110a may read and write data using the R1 volume in 2102, and the RRF may handle the automatic copying and updating of data from R1 to R2 in the data storage system 2104. Communications between the storage systems 2102 and 2104 may be made over connections 2108b, 2108c to the network 2122.

A RRF may be configured to operate in one or more different supported replication modes. For example, such modes may include synchronous mode and asynchronous mode, and possibly other supported modes. When operating in the synchronous mode, the host does not consider a write I/O operation to be complete until the write I/O has been completed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

With synchronous mode remote data replication, a host 2110a may issue a write to the R1 device 2124. The primary or R1 data storage system 2102 may store the write data in its cache at a cache location and mark the cache location as including write pending (WP) data as mentioned elsewhere herein. The RRF operating in the synchronous mode may propagate the write data across an established connection or link (more generally referred to as a the remote replication link or link) such as over 2108b, 2122, and 2108c, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110a that the write has been received and completed. Thus, generally, R1 device 2124 and R2 device 2126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
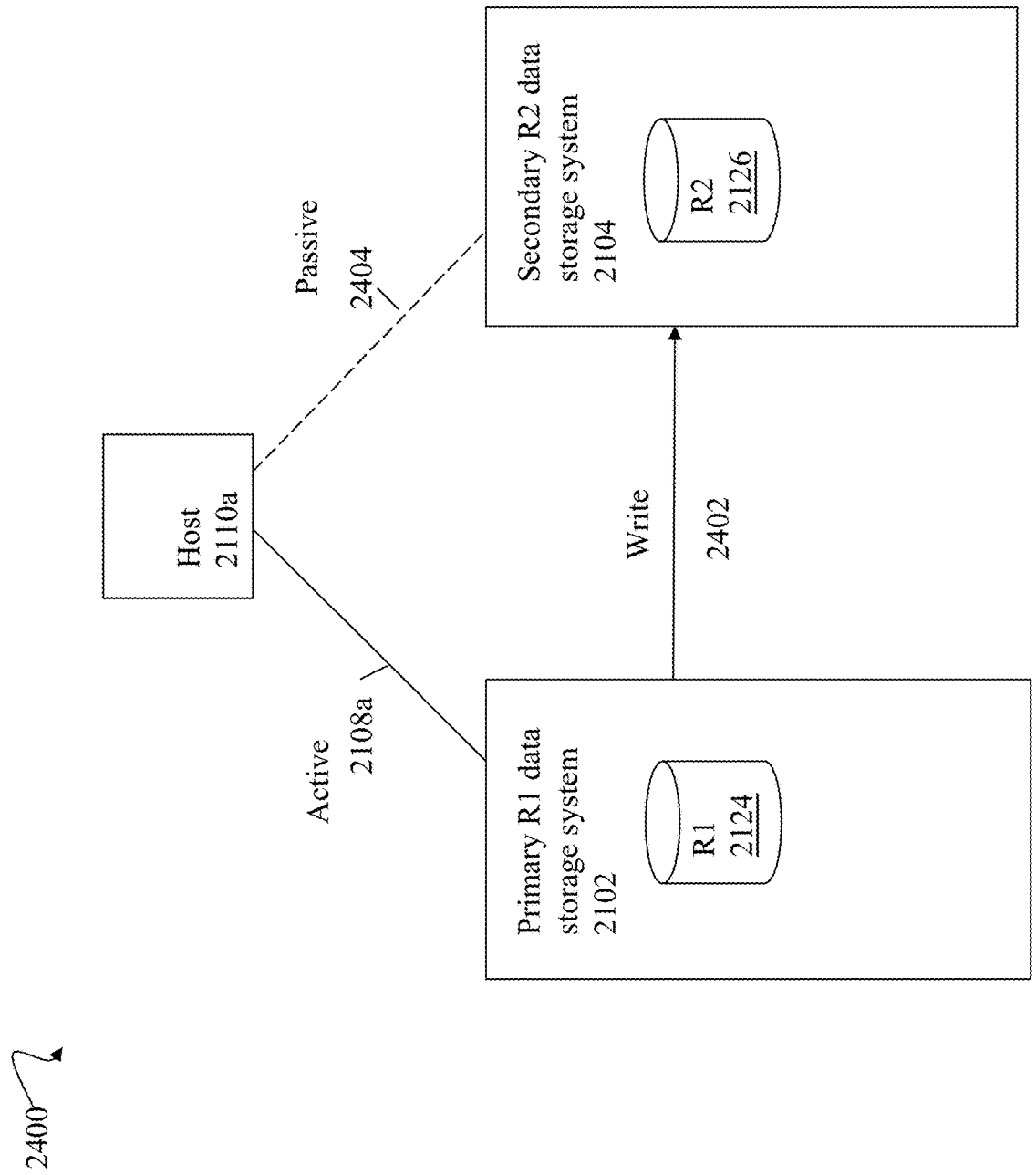
FIG. 4 is an example illustrating an active-passive replication arrangement.

With reference to FIG. 4, shown is a further simplified illustration of components that may be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, may also be used in connection with other information and communications exchanged between the systems 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104.

In the configuration of 2400, the R1 device 2124 and R2 device 2126 may be configured and identified as the same LUN, such as LUN A, to the host 2110a. Thus, the host 2110a may view 2108a and 2404 as two paths to the same LUN A, where path 2108a is active (over which I/Os may be issued to LUN A) and where path 2404 is passive (over which no I/Os to the LUN A may be issued). For example, the devices 2124 and 2126 may be configured to have the same logical device identifier such as the same world wide name (WWN) or other identifier as well as having other attributes or properties that are the same. Should the connection 2108a and/or the R1 data storage system 2102 experience a failure or disaster whereby access to R1 2124 configured as LUN A is unavailable, processing may be performed on the host 2110a to modify the state of path 2404 to active and commence issuing I/Os to the R2 device configured as LUN A. In this manner, the R2 device 2126 configured as LUN A may be used as a backup accessible to the host 2110a for servicing I/Os upon failure of the R1 device 2124 configured as LUN A.

The pair of devices or volumes including the R1 device 2124 and the R2 device 2126 may be configured as the same single volume or LUN, such as LUN A. In connection with discussion herein, the LUN A configured and exposed to the host may also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links may be used in connection with replicating data from systems 2102 to system 2104.

Figure 5:
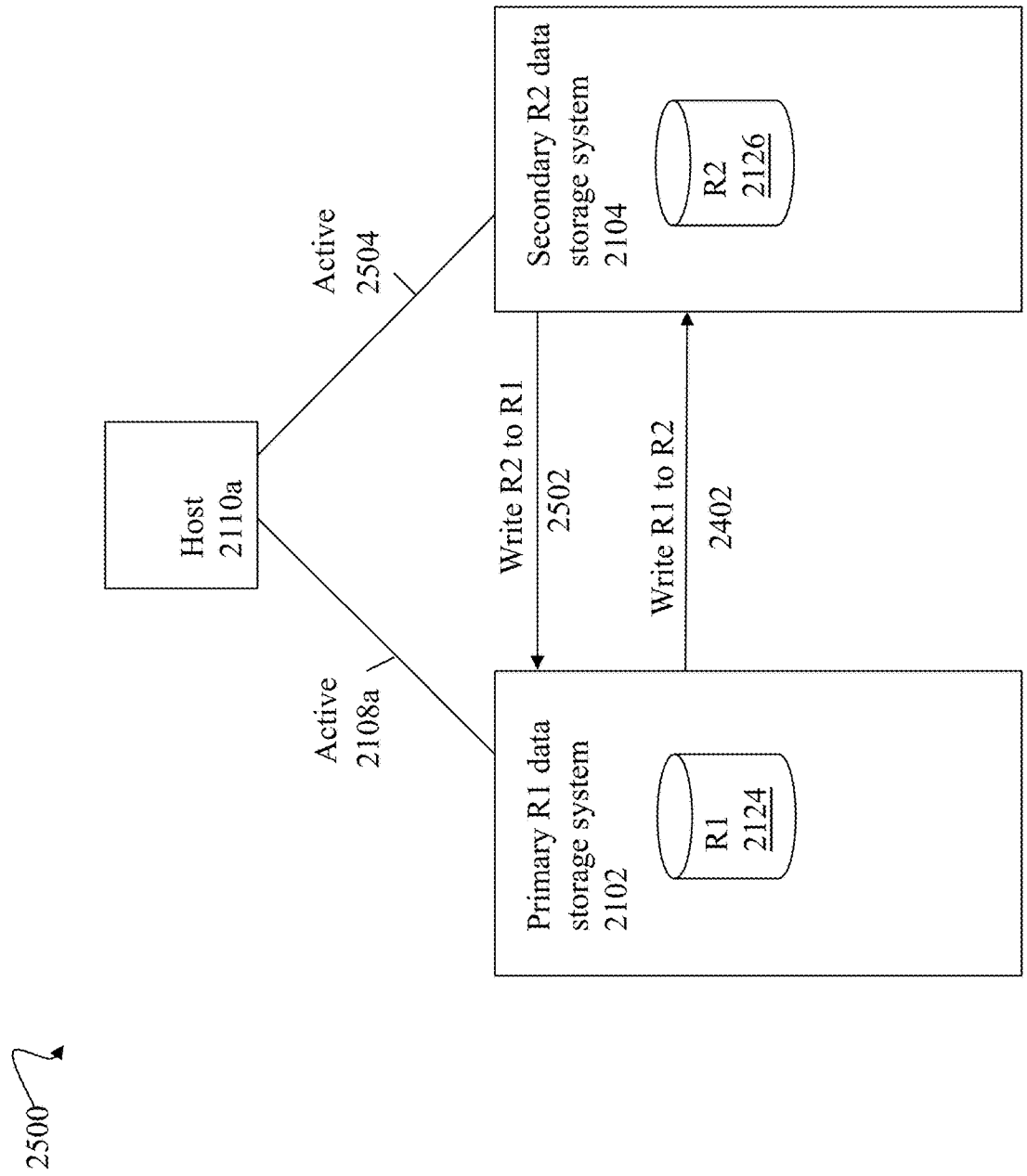
FIG. 5 is an example illustrating an active-active arrangement with a stretched volume in an embodiment in accordance with the techniques herein.

Referring to FIG. 5, shown is an example configuration of components that may be used in an embodiment in accordance with the techniques herein. The example 2500 illustrates an active-active configuration as may be used in connection with synchronous replication in at least one embodiment in accordance with the techniques herein. In the active-active configuration with synchronous replication, the host 2110a may have a first active path 2108a to the R1 data storage system and R1 device 2124 configured as LUN A. Additionally, the host 2110a may have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration may issue I/Os, both reads and/or writes, over both of the paths 2108a and 2504 at the same time. The host 2110a may send a first write over the path 2108a which is received by the R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The host 2110a may also send a second write over the path 2504 which is received by the R2 system 2104 and written to the cache of the R2 system 2104 where, at a later point in time, the second write is destaged from the cache of the R2 system 2104 to physical storage provisioned for the R2 device 2126 configured as the LUN A. The R2 system 2104 also sends the second write to the R1 system 2102 over a second link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the R1 system 2102, the R1 system 2102 sends an acknowledgement over the link 2502 to the R2 system 2104 that it has completed the second write. Once the R2 system 2104 receives the acknowledgement from the R1 system (regarding completion of the second write), the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that although FIG. 5 illustrates for simplicity a single host accessing both the R1 device 2124 and R2 device 2126, any number of hosts may access one or both of the R1 device 2124 and the R2 device 2126.

Although only a single link 2402 is illustrated in connection with replicating data from systems 2102 to system 2104 in connection with techniques herein, more generally any number of links may be used. Although only a single link 2502 is illustrated in connection with replicating data from systems 2104 to system 2102, more generally any number of links may be used. Furthermore, although 2 links 2402 and 2502 are illustrated, in at least one embodiment, a single link may be used in connection with sending data from system 2102 to 2104, and also from 2104 to 2102.

FIG. 5 illustrates an active-active remote replication configuration for the stretched LUN A. The stretched LUN A is exposed to the host by having each volume or device of the device pair (R1 device 2124, R2 device 2126) configured and presented to the host as the same volume or LUN A. Additionally, the stretched LUN A is configured for two way synchronous remote replication between the two devices or volumes of the device pair.

In an embodiment described herein, the data storage system may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states (also sometimes referred to herein as ALUA states or path states) may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

Figure 6:
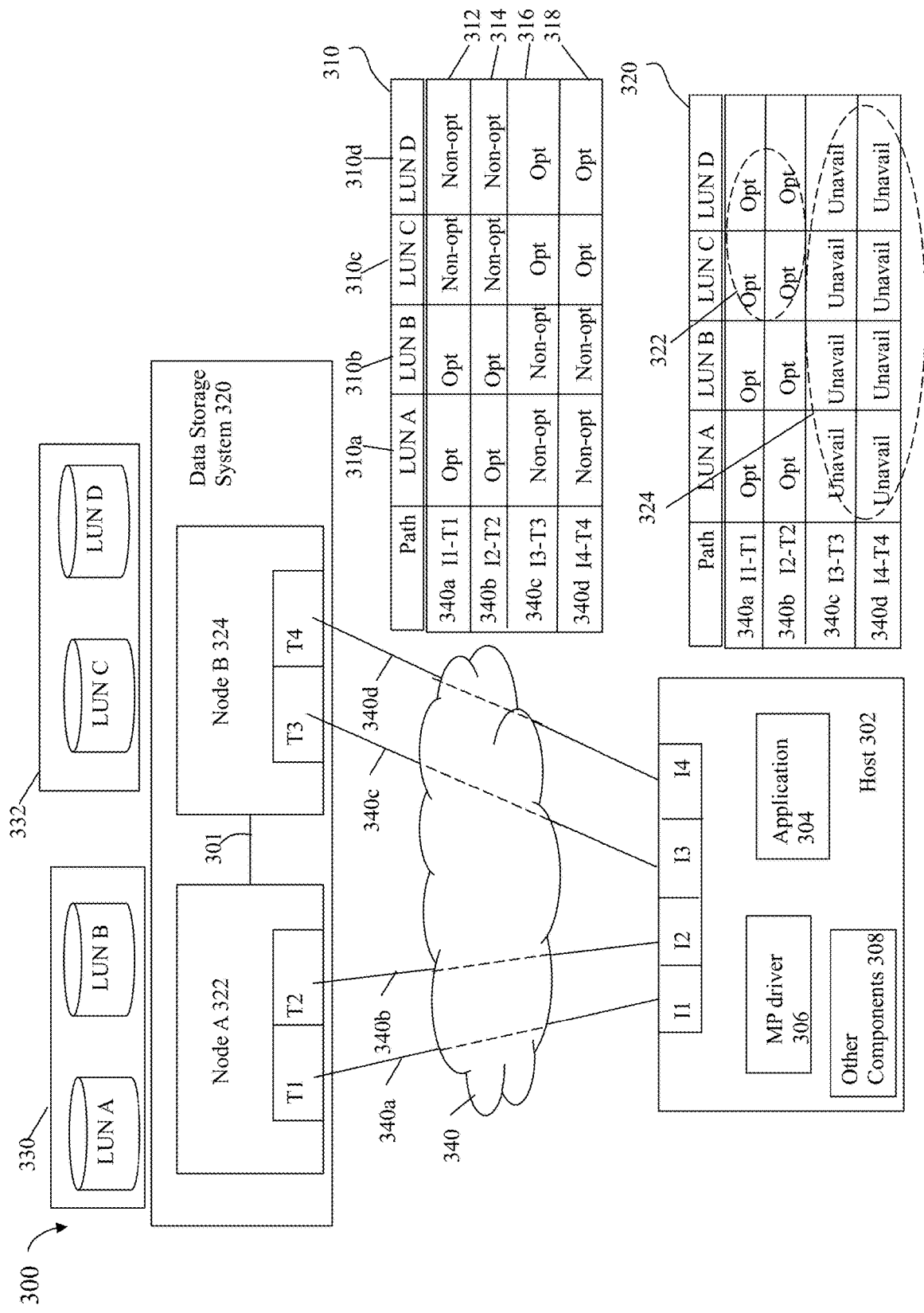
FIG. 6 is an example illustrating path states for paths between a host and a data storage system that may be used in an embodiment in accordance with the techniques herein.

Referring to FIG. 6, shown is an example of an embodiment of a system that may be utilized in connection with the techniques herein. The example 300 includes a host 302, a network 340 and a data storage system 320. The host 302 and the data storage system 320 may communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The host 302 may also include other components 308 such as one or more other layers of software used in connection with communicating the I/O operation from the host to the data storage system 120. For example, element 108 may include Fibre Channel (FC), SCSI and NVMe (Non-Volatile Memory Express) drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 106 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340a-d. As described in more detail below, each of the paths 340a-d may have an associated ALUA state also used by the host when issuing I/O operations. Each path 340a-d may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) directed to the LUNs 330, 332 of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states.

Although discussion herein may refer to the data storage system setting and modifying the path access states of the paths between the host and the data storage system, in some embodiments, a host may also set and/or modify the path access states which are then communicated to the data storage system.

In accordance with the techniques herein, the data storage system may set the path state for a particular LUN to preferred or non-preferred for any suitable purpose. In at least one embodiment, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which the host may issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states may be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments may have different path state changes than as denoted by the table 320.

A metro cluster configuration may be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the same single stretched volume, device or LUN.

In a metro cluster configuration, each of the two data storage systems may be in different data centers or may be in two server rooms or different physical locations within the same data center. The metro cluster configuration may be used in a variety of different use cases such as, for example, increased availability and disaster avoidance and DR, resource balancing across data centers and data storage systems, and storage migration.

In a metro cluster configuration, hosts may be configured with uniform host connectivity as illustrated in FIGS. 4 and 5, where a host may be connected to both data storage systems exposing the pair of devices or volumes configured as the same stretched volume or LUN, such as the LUN A described in connection with FIG. 5. From the perspective of the host 2110a of FIG. 5, the data storage system 2102 may be a local data storage system included in the same data center as the host 2110a, and the data storage system 2104 may be a remote data storage system. Thus the host 2110a is configured with uniform host connectivity. In contrast to uniform host connectivity is non-uniform host connectivity, where the host is only connected to the local data storage system but not the remote data storage system of the metro cluster configuration.

Figure 7A:
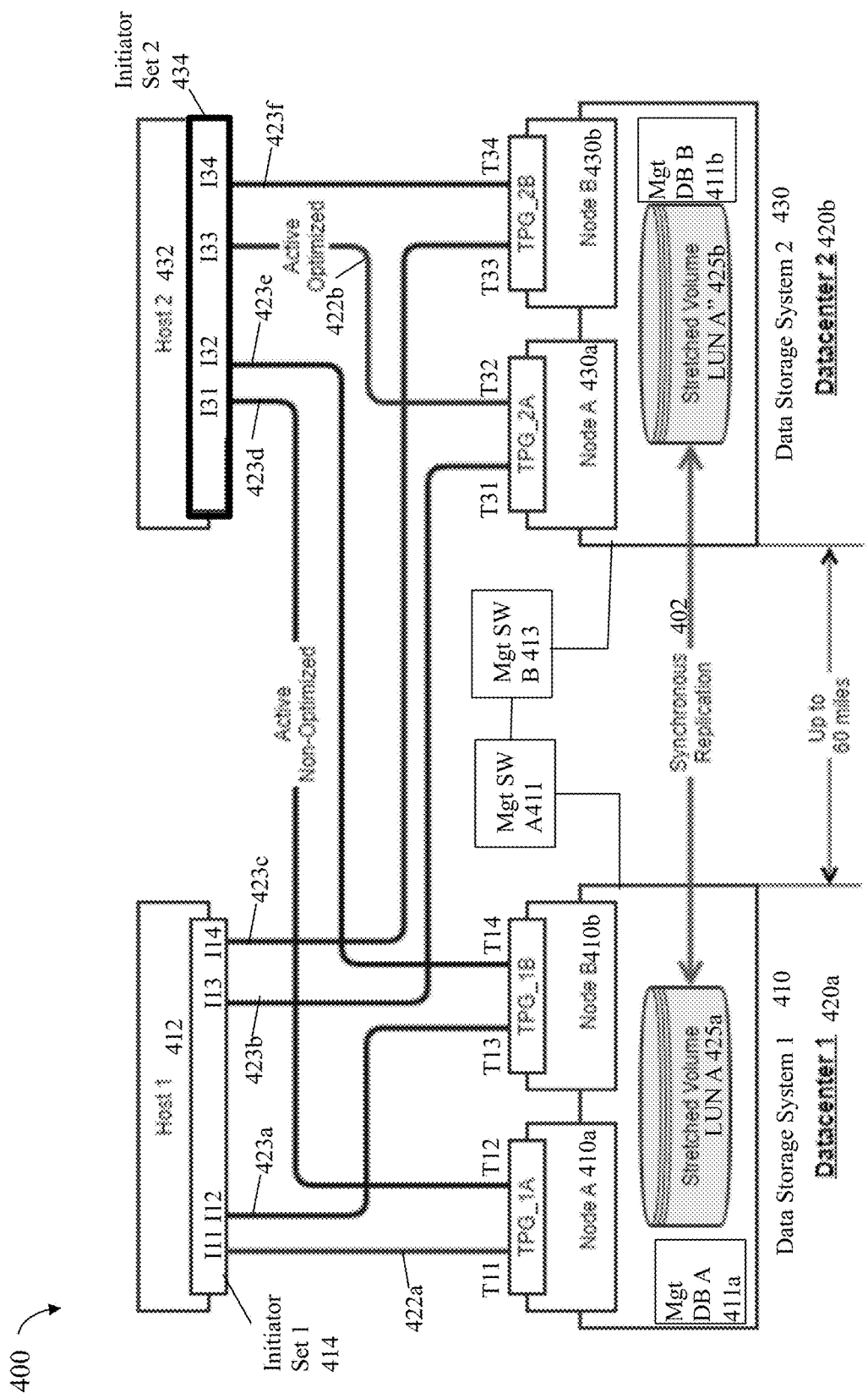
FIGS. 7A and 7B are examples illustrating path states for paths between multiple data storage systems and multiple hosts in a metro cluster configuration with a stretched volume in embodiments in accordance with the techniques herein.

Referring to FIG. 7A, shown is a more detailed illustration of a metro cluster configuration. The example 400 includes a stretched volume or LUN A and two hosts configured 412, 414 with uniform host connectivity in at least one embodiment in accordance with the techniques herein.

In the FIG. 7A, the host 1 412 and the data storage system 1 410 are in the data center 1 420a. The host 2 414 and the data storage system 2 430 are in the data center 2 420b. The host 1 412 includes the initiators I11-I14. The host 432 includes the initiators I31-I34. The data storage systems 410, 430 may be dual node data storage systems such as described elsewhere herein (e.g., FIG. 2). The data storage system 410 includes the node A 410*a* with the target ports T11-T12, and the node B 410*b* with the target ports T13-T14. The data storage system 430 includes the node A 430*a* with the target ports T31-T32, and the node B 430*b* with the target ports T33-T34. From the perspective of host 1 412, the data storage system 1 410 and data center 1 420*a* may be characterized as local, and the data storage system 2 430 and the data center 2 420*b* may be characterized as remote. From the perspective of host 2 432, the data storage system 1 410 and data center 1 420*a* may be characterized as remote, and the data storage system 2 430 and the data center 2 420*b* may be characterized as local.

As illustrated in the FIG. 7A, the stretched volume or LUN A is configured from the device or volume pair LUN A 425*a* and LUN A" 425*b*, where both the LUNs or volumes 425*a-b* are configured to have the same identity from the perspective of the hosts 412, 432. The LUN A 425*a* and the LUN A" 425*b* are configured for two way synchronous remote replication 402 which, consistent with other description herein, provides for automated synchronous replication of writes of the LUN A 425*a* to the LUN A" 425*b*, and also automated synchronous replication of writes of the LUN A" 425*b* to the LUN A 425*a*. The LUN A 425*a* may be exposed to the hosts 412, 432 over the target ports T11-T14 of the system 410, and the LUN A" 425*b* may be exposed to the hosts 412, 432 over the target ports T31-T34.

In at least one embodiment in which the arrangement of FIG. 7A is in accordance with the ALUA protocol, the paths 423*a-f* may be configured with the path state of active non-optimized and the paths 422*a-b* may be configured with the path state of active optimized. Thus, the host 412 has uniform host connectivity to the stretched volume or LUN A by the active connections or paths 422*a* (I11-T11), 423*a* (I12-T13) to the data storage system 410 exposing the LUN A 425*a*, and the active connections or paths 423*b* (I13-T31), 423*c* (I14-T33) to the data storage system 430 exposing the LUN A" 425*b*. The host 432 has uniform host connectivity to the stretched volume or LUN A by the active connections or paths 423*d* (I31-T12), 423*e* (I32-T14) to the data storage system 410 exposing the LUN A 425*a*, and the active connections or paths 422*b* (I33-T32), 423*f* (I34-T34) to the data storage system 430 exposing the LUN A" 425*b*.

Uniform host connectivity deployments such as illustrated in FIG. 7A offer high resiliency to failure of any local component or cross data center connection. Failures such as a total loss of a local storage system (that is local from a host's perspective) result in the host performing I/Os using the cross-datacenter links to the remote data storage system, which results in increased latency but does not require immediate application restart since I/Os issued from the host are still serviced using the remote data storage system. FIG. 7A illustrates a configuration that may also be referred to as a metro cluster configuration with a pair of data storage systems 410, 430. With respect to a host, such as the host 412, one of the data storage systems, such as the system 410, may be local and in the same data center as the host, and the other remaining data storage system, such as the system 430, may be remote and in a different location or data center than the host 412.

With reference to FIG. 7A, the element 411 denotes the data storage system management software application A for the system 410, and the element 413 denotes the data storage system management application B for the system 430. The management applications 411 and 413 may communicate with one another through a network or other suitable communication connection when performing the processing needed for the techniques described herein. The element 411*a* represents the management database (DB) A that stores management and other information used by the management application A 411 for the system 410. The element 413*a* represents the management DB B that stores management and other information used by the management application B 413 for the system 430.

To further illustrate, the FIG. 7A may denote the path states at a first point in time T1. At a second point in time T2 subsequent to T1 and illustrated in the FIG. 7B, the data storage system 2 430 may experience a failure or disaster where the LUN A" 425*b* on data storage on the system 430 is unavailable and cannot be accessed through the target ports T31-34. In response to the unavailability of the data storage system 430, the host 2 432 uses the path 454*b* to issue I/Os to the LUN A 425*a* on the data storage system 410. Thus, failure of the system 430 that is local to the host 432 results in the host 432 performing I/Os using the cross-data center link 454*b* to the remote system 410 which results in increased latency but does not require immediate application restart since I/Os issued by the application 3 (app 3) on the host 432 may still be serviced using the remote system 410.

In response to the unavailability of the data storage system 430, the paths 452*a-d* to the system 430 transition to the unavailable path state, the path 454*a* remains active optimized, the path 454*b* transitions from active non-optimized to active optimized, and the remaining paths 456*a-b* remain active non-optimized.

FIG. 7A illustrates connectivity between the hosts 412, 432 and the data storage systems 410, 430 under normal operating conditions where both systems 410, 430 and both volumes or LUNs 425*a*, 425*b* are available to the hosts 412, 432 for servicing I/Os. In such normal operating conditions, the ALUA path states may be as described in connection with FIG. 7A where each of the hosts 412, 432 issues I/Os to the particular one of the systems 410, 430 that is local or in the same data center as the particular host. In such normal operating conditions as illustrated in FIG. 7A, at least one "local path" between the host and the local data storage system is active optimized, and remote paths between the host and the remote data storage system are active non-optimized. One or more of the remote paths with respect to a particular host may be used in the event the local data storage system and/or local paths to the local data storage system are unavailable such as described in connection with FIG. 7B with respect to the host 412.

Thus, in the absence of a data storage system failure and under normal operating conditions such as illustrated in FIG. 7A, the host 412 issues I/Os to its local data storage system 410 where the host 412 and the system 410 are located in the same data center 420*a*; and the host 432 issues I/Os to its local data storage system 430 where the host 432 and the system 430 are located in the same data center 420*b*.

Generally, there are several ways to accomplish having each host under normal conditions issue I/Os to a local data storage system in the same data center as the host.

In some implementations, a native host multi-path driver or a third party multi-path drive may be able to differentiate the particular paths to the local data storage system and the particular paths to the remote data storage system based on path latency. Generally the paths experiencing the largest latencies when sending an I/O may be determined as those to the remote data system, and those with the smallest latencies may be determined as those to the local data storage system. In such implementations, the host utilizes its multi-path driver to select a particular path to a local data storage system over which to send I/Os. However, implementing a metro cluster solution with reliance on such native or third party multi-path drivers that detect local paths based on latency may be undesirable. For example, a native or third party multi-path driver that detects local and remote paths based on latency may not be available for use on all supported host operating systems. Additionally, even if such a native or third party multi-path driver is available for use with a particular host, there is an undesirable additional cost and complexity for customers to use such drivers.

Figure 7B:
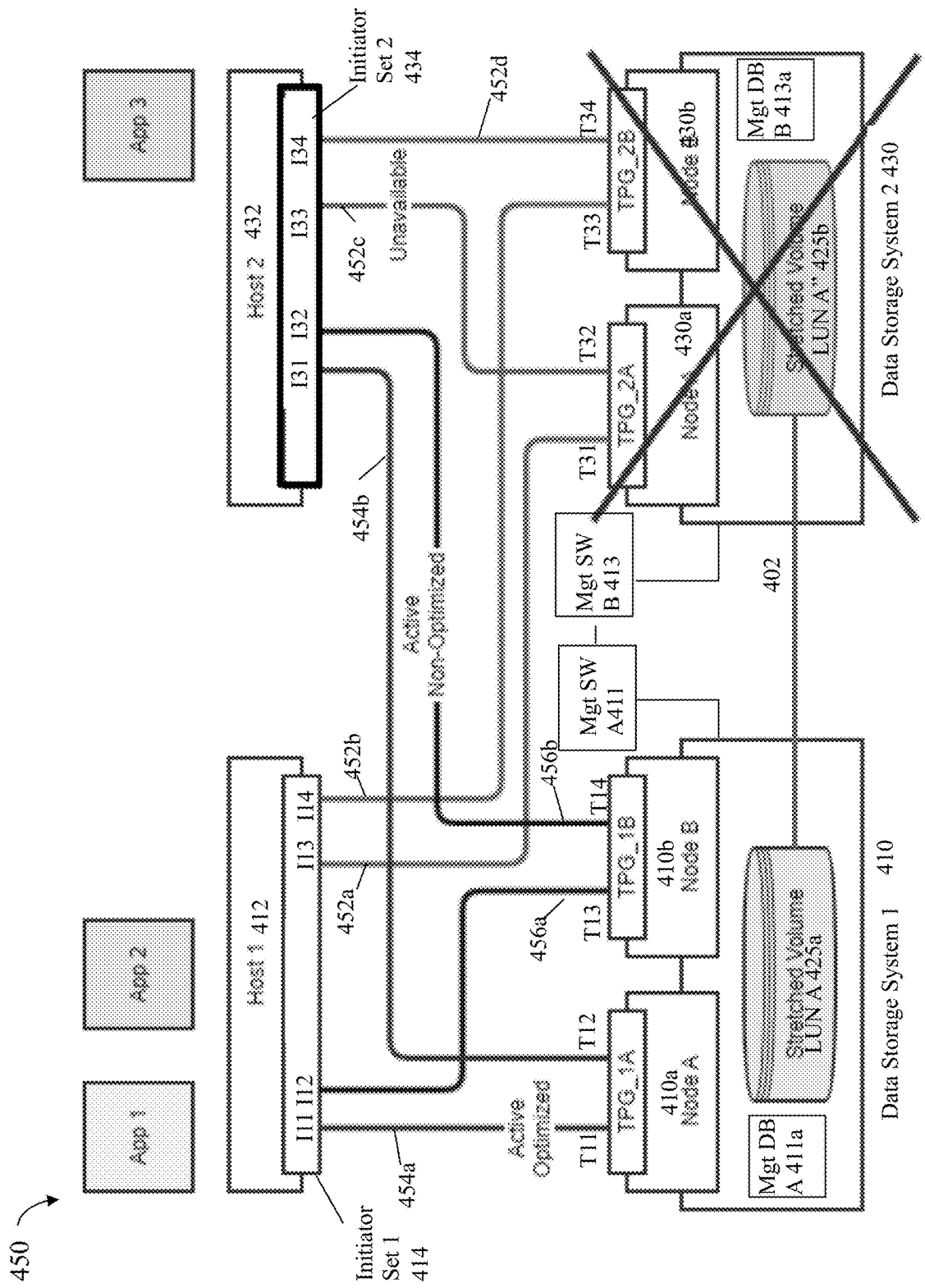

In at least one embodiment in accordance with the techniques herein, processing may be performed consistent with discussion elsewhere herein where the data storage systems determine the ALUA path states, such as in connection with FIGS. 6, 7A and 7B, and expose or communicate such ALUA path states (also sometimes referred to herein access states) to the hosts. Thus, when the LUN is exposed to a host initiator over multiple paths (e.g., where the same LUN is accessible through multiple different target ports of the data storage system), the data storage systems may vary the associated access state of each such path in order to vary and control the particular ones of the multiple paths over which the host may issue I/Os to the LUN. In particular, processing may be performed by the data storage systems, such as the systems 410, 430 of FIGS. 7A and 7B, to determine which particular paths to the hosts 412, 432 are active optimized and which are active non-optimized at various points in time. The processing may include the data storage systems 410, 430 communicating the path states to the hosts 412, 432 and then also notifying the hosts 412, 432 when there are any changes to the path states, such as in response to a data storage system failure such as illustrated in FIG. 7B. In this manner, the hosts 412, 432 may select paths over which to send I/Os based on the particular ALUA path states or access states for particular volumes or LUNs as determined and communicated by the data storage systems 410, 430, where I/Os are sent by the hosts over those active-optimized paths.

In connection with the data storage system setting and reporting ALUA path states for a stretched volume or LUN exposed to a host in a metro cluster configuration, all TPGs and target ports within such TPGs across the metro cluster configuration need to have unique identifiers. In particular with respect to an exposed stretched volume or LUN, each TPG ID (identifier) must be different and unique from every other TPG ID in the metro cluster configuration, and each target port ID must be different and unique from every other target port ID in the metro cluster configuration. The TPG IDs may be characterized as having a first TPG namespace, and the target port IDs may be characterized as having a second target port ID namespace. The first TPG namespace is separate from the second target port ID namespace.

A problem may arise in connection with a stretched volume or LUN in a metro cluster configuration across multiple data storage systems. For example, consider the configuration of FIG. 7A where each of the two data storage systems 410 and 430 are separately initialized and configured. A first data storage system, such as the system 410, may be configured to use a first set of TPG IDs and target port IDs. A second data storage system, such as the system 430, may be configured to use a second set of TPG IDs and target port IDs. Assume that the systems 410 and 430 have been initialized and configured independently at different points in time but the first set of TPG IDs and target port IDs is the same as the second set of TPG IDs and target port IDs. More generally, there may be at least some overlap in terms of TPG IDs and target port IDs between the first set of IDs of the system 410 and the second set of IDs of the system 430. For example, the system 410 may have assigned the physical TPG TPG_1A the TPG ID=ID1 and the system 430 may have assigned the physical TPG TPG_2A the same TPG ID=ID1. Now assume that processing is performed to configure a metro cluster configuration with a stretched volume or LUN as in FIG. 7A which attempts to combine the systems 410, 430 into a single metro cluster configuration. However, there is problem in that two different physical target port groups, TPG_1A of the system 410 and TPG_2A of the system 430, have the same TPG ID=ID1.

To avoid the foregoing collision of overlapping TPG IDs and overlapping target port IDs, one solution may be to configure each data storage system or appliance when manufactured or shipped so that each physical TPG has a unique TPG ID and each physical target port has a unique target port ID. In this manner, it may be guaranteed that each target port ID is unique across all such systems that may possibly be combined and each TPG ID is unique across all such systems that may possibly be combined. However, protocols may limit the size of such identifiers. For example, the SCSI protocol limit the size of TPG IDs and target port IDs to 16 bits thereby providing an insufficient range for allocating unique TPG IDs and target port IDs across all such systems that are shipped or manufactured.

When reporting the TPG IDs and the target port IDs over which a particular volume or LUN is exposed in accordance with the SCSI protocol, each TPG ID must be different and unique from every other TPG ID, and each target port ID must be different and unique from every other target port ID. However, although the SCSI specification may require unique TPG IDs and unique target port IDs on a per LUN or per volume basis, the SCSI specification or protocol does not require reporting the same set of TPG IDs and the same set of target port IDs for each of the different volumes or LUNs. In accordance with the SCSI standard in at least one embodiment in accordance with the techniques herein, different volumes or LUNs may each have different sets of IDs for TPGs and target ports.

A such, to overcome the above-noted problems, described in the following paragraphs are techniques that report a different set of IDs for each of the two LUN or volume instances comprising the same stretched volume. For example, with reference to FIG. 7A, consider the stretched volume configured with the two volume instances 425a and 425b. Despite the fact that the system 410 and the system 430 may both be initially configured, respectively, to use the same TPG ID for the different physical TPGs TPG_1A and TPG_2A, the techniques herein provide for reporting a different TPG ID for each of the physical TPGs TPG_1A and TPG_2A—for the volume instances 425a, 425b. In accordance with the techniques herein, a first set of TPG IDs is reported for the TPGs of the system 410 in connection with the volume 425a; and a second set of TPG IDs is reported for the TPGs of the system 430 in connection with the volume 425b, where each TPG ID is unique across both the first and second sets of TPG IDs (e.g., across the set union of the first and second set of TPG IDs). In accordance with the techniques herein, a third set of target port IDs is reported for the target ports of the system 410 in connection with the volume 425a; and a fourth set of target port IDs is reported for the target ports of the system 430 in connection with the volume 425b, where each target port ID is unique across both the third and fourth sets of target port IDs (e.g., across the set union of the first and second set of target port IDs). Thus, the uniqueness requirement is maintained in that each TPG ID is unique across all TPG IDs for the stretched volume or LUN having two different instances 415a, 425b that are configured with the same volume or LUN identity and thus exposed as the same single stretched LUN or volume.

Additionally, in at least one embodiment in accordance with the techniques herein, two different TPG IDs associated, respectively, with two different volumes may be assigned or associated with the same physical TPG. For example, two different LUNs or volumes V1, V2, may be exposed over the same physical TPG, where the TPG ID1 may be assigned or associated with the physical TPG when reporting information about V1, and the TPG ID2 may be assigned or associated with the same physical TPG when reporting information about a different volume V2. In this manner, the data storage system may associate multiple different TPG IDs with the same physical TPG, and may similarly associate multiple different target port IDs with the same physical target port of the data storage system when referencing different volumes or LUNs exposed over the same physical TPG and the same physical target port.

In at least one embodiment, the IDs associated with, and reported for, the target ports and the TPGs for an exposed volume or LUN are determined in accordance with properties or attributes of the volume or LUN. In such an embodiment, the properties may include whether the volume is stretched or unstretched (sometimes referred to herein as non-stretched), and whether the volume is using normal port ID ranges or extended port ID ranges. The normal port ID ranges include a normal TPG ID range and a normal target port ID range. The extended port ID ranges include an extended TPG id range and an extended target port ID range.

To implement extended TPG IDs and extended target port IDs, an embodiment may utilize a normal port range attribute (sometimes denoted as "normal") and an extended port range attribute (sometimes denoted as "extended"). In at least one embodiment in accordance with the techniques herein, a volume or LUN may have either the attribute normal or the attribute extended to denote the particular port ID ranges to be used when reporting information regarding paths about the exposed volume or LUN to the host (e.g., local TPGs and local target ports included in the same data storage system and data center as the exposed volume or LUN instance). In at least one embodiment, when the data storage system is reporting information about a particular exposed LUN or volume to the host such as in response to a SCSI command, the data storage system may determine whether the particular LUN or volume has the normal or extended attribute set. If the volume or LUN has the extended attribute set, the data storage system may automatically convert all IDs of local target ports and local TPGs (in the same data storage system as the volume or LUN) to corresponding IDs in the extended ID port range (sometimes referred to as the extended ID range or extended range). Otherwise, the volume or LUN has the normal attribute set and no such conversion is performed and all local IDs reported are in the normal ID port range (sometimes referred to as the normal ID range or normal range). In such embodiments as discussed in more detail below, the data storage systems may be initially configured and initialized with TPG IDs and target port IDs in the normal range. When the extended attribute is set for a LUN that is exposed to a host that requests information identifying the particular target ports and TPGs over which the LUN is exposed to the host, processing may be performed to convert the existing normal range IDs of the local target ports and the local TPGs to corresponding IDs in the extended ID port range (sometimes referred to as the extended ID range or extended range).

In the following paragraphs, the techniques herein may refer to a SCSI based protocol, such as FC or iSCSI. However, the metro cluster configuration, stretched volume, and the techniques described in the following paragraphs may also be used in embodiments using other suitable protocols.

In at least one embodiment in accordance with the SCSI standard, each ID of a TPG and a target port is 16 bits in size and cannot be zero. Therefore each such ID is in the inclusive range of 1 through $2^{16}-1$. In at least one embodiment embodiment, a number of high or most significant bits, such as 4 bits, of each ID may be reserved for use with the extended port ID ranges (sometimes referred to herein as extended ranges or extended ID ranges). In such an embodiment, when reporting IDs used for local TPGs and local target ports for an exposed LUN or volume having the extended port attribute set, the IDs have the top 4 bits all set to 1 (e.g., "F" in hexadecimal). Otherwise, the volume or LUN has the normal attribute set and no such conversion is performed, where the local TPG IDs and local target port IDs over which the volume is exposed are reported as IDs in the normal ID range where the top 4 bits are all set to 0 (e.g., "0" in hexadecimal). Consistent with other discussion herein, the foregoing use of the high or most significant 4 bits is just one example. Depending on the implementation, the number of the high or most significant bits may be, for example, 2, 8, or some other suitable number of high or most significant bits. In this manner, although a data storage system may be have been configured and initialized to have target port IDs and TPG IDs in the normal ID range associated, respectively, with particular physical target ports and physical TPGs, the techniques herein provide for automatically converting the target port IDs and TPG IDs into corresponding extended IDs in the extended ID ranges for exposed volumes or LUNs with the extended attribute.

It should be noted that more generally, an embodiment may add or set the top N bits of the IDs to any suitable value as part of the conversion process to generate IDs in an extended ID range. In the foregoing example, N is 4 and the top 4 bits are all set to 1 (e.g., the value "F" in hexadecimal or Fx) as part of the conversion process for when the extended attribute is set for an exposed LUN. More generally, N may be any suitable integer number of bits and the N bits may be set, as part of the conversion process, to any suitable value and is not limited to Fx. In this manner, two data storage systems configured to have the same target port IDs and the same TPG IDs may use the techniques herein in a metro cluster configuration for a stretched volume having a first volume R1 on a first data storage system DS1 and a second volume R2 on a second data storage system DS2, where R1 and R2 are configured to have the same identity and appear to the host as the same LUN or volume. In such a metro cluster configuration, the techniques herein provide for converting the target port IDs and the TPG IDs of the DS2 exposing the R2 copy of the stretched volume to IDs in the extended ID range thereby avoiding duplication and avoiding collision with other target port IDs and TPG IDs of the DS1 exposing the R1 copy of the stretched volume. In such an embodiment, an assumption is that the target port IDs and the TPG IDs of the DS1 and the DS2 were both previously configured and initialized to only have IDs in the normal range. In an embodiment in which the highest or most significant 4 bits are reserved and used for the extended range IDs, the normal range includes values expressed using only the lower 12 bits of each 16 bit ID (e.g., maximum value of $2^{12}-1$).

In at least one embodiment in accordance with the techniques herein, the extended and normal attributes may be associated with a volume or LUN and used by the data storage system to determine what TPG IDs and target port IDs to report to the host regarding the particular volume or LUN. The host may send a command to the data storage system requesting information about a particular LUN or volume. In response, the data storage system may report information about the volume or LUN. The information reported may include the TPG IDs and target port IDs over which the volume or LUN is exposed. For the volume or LUN exposed over paths between target ports and host initiator ports, the information reported may also identify the particular ALUA path states of such paths. Such reporting may be used by the host, for example, in connection with discovery and other processing so that the host knows the particular ALUA path states and the particular target port IDs to use when sending an I/O to the data storage system. As discussed elsewhere herein, the host may use the ALUA path states communicated in the reporting information to identify and select a path that is active optimized and then send I/Os directed to the volume or LUN over the active optimized path to a particular target port ID.

Whether a LUN or volume has the extended or the normal attribute may not be determined in accordance with whether or not the LUN is co-located in the same data center as the host. Rather, as discussed in more detail below, the extended or normal attribute may be set and assigned to the volume or LUN in accordance with different operations, such as the stretch operation and the unstretch operation discussed below, that may be performed on the volume or LUN. In one aspect, the normal attribute may be characterized as opposite the extended attribute and, for any stretched LUN configured from two volumes V1 and V2, any one of the two volumes may have the normal attribute and the remaining other volume has the extended attribute set. If a volume or LUN has the extended attribute set, all TPGs and target ports that are local to the volume or LUN and included in the same data storage system as the configured volume or LUN are reported as having, respectively, extended target TPG IDs and extended target port IDs.

Consistent with discussion herein such as in connection with FIGS. 5, 7A and 7B, a stretched volume or LUN is configured from a LUN or volume pair (R1, R2), where R1 and R2 are different instances of LUNs or volumes respectively on two data storage systems of the metro cluster. Further, the volumes R1 and R2 are configured to have the same identity and appear to a host as the same volume or LUN. Thus a volume or LUN on a first local data storage system may be characterized as stretched if that volume or LUN also has a matching counterpart remote volume or LUN on the other remote data storage system of the metro cluster pair.

In contrast to the stretched volume or LUN is an unstretched or non-stretched volume or LUN. A volume or LUN may be characterized as an unstretched volume or LUN existing on only one data storage system within the metro cluster pair.

An operation referred to herein as stretching a LUN or volume may be applied to an unstretched LUN or volume whereby a local unstretched volume or LUN on only one of the data storage systems of the metro cluster pair is converted to a stretched LUN or volume. Converting the unstretched volume or LUN of a first local data storage system of the metro cluster pair to a stretched volume may include creating a counterpart remote LUN on the second remote data storage system of the metro configuration.

Consistent with other discussion herein regarding a stretched volume or LUN, from the external host perspective, the counterpart remote LUN is configured to have the same identity as the non-stretched LUN on the first data storage system. In connection with stretching an existing local unstretched LUN having the normal attribute, the local LUN has its attribute modified to stretched to denote a stretched volume. Additionally, the remote counterpart LUN that is created has the extended attribute and the stretched attribute. If the remote stretched counterpart LUN is subsequently unstretched (described in more detail elsewhere herein) where the remote counterpart LUN remains and the local LUN is removed, the extended attribute will remain set for the remote counterpart LUN since the target port IDs and TPG IDs cannot be modified for the LUN as the host is using such extended range IDs even after the remote counterpart LUN is unstretched.

In at least one embodiment in accordance with the techniques herein, a stretch operation may also be applied to an existing local unstretched LUN having the extended attribute. In this case, the stretch operation results in the local LUN having its attribute modified to stretched to denote a stretched volume and the local LUN retains its extended attribute. Additionally, the remote counterpart LUN that is created in this case has the normal attribute and the stretched attribute.

In connection with stretching a LUN, such as stretching the LUN A 425a resulting in the stretched LUN or volume configuration with the volumes 425a and 425b as illustrated in the FIG. 7A, ALUA path state changes may be made so that the host 1 412 local to the storage system 410 has one or more active optimized paths to the local stretched LUN copy 425a on the system 410 and one or more active non-optimized paths to the remote stretched LUN copy 425b on the system 430. Additionally, ALUA path state changes may be made so that the host 2 432 local to the storage system 430 has one or more active optimized paths to the local stretched LUN copy 425b on the system 430 and one or more active non-optimized paths to the remote stretched LUN copy 425a on the system 410. In some contexts as discussed herein, a LUN or volume and data storage system may be characterized as local with respect to a host if the host, LUN and data storage system are located in the same data center. Also in some contexts as discussed herein, a volume or LUN may be characterized as having local target ports and local TPGs over which the LUN is exposed to a host. In this case, such local ports and local TPGs may be characterized as local with respect to the LUN in that the LUN, local ports and local TPGs are all included in the same data storage system.

An operation referred to herein as unstretching a LUN or volume may be applied to a stretched LUN or volume whereby the stretched LUN or volume is converted to a local unstretched volume or LUN on only one of the data storage systems of the metro cluster. The existing stretched volume is configured from a volume pair (R1, R2), where R1 and R2 are different instances of LUNs or volumes respectively on two data storage systems of the metro cluster and R1 and R2 are configured to have the same identity and appear to a host as the same volume or LUN. Converting the stretched volume or LUN to an unstretched volume R1 on only a first data storage system of the metro cluster pair may include deleting or removing its counterpart remote volume R2 on the second remote data storage system of the metro configuration.

An unstretched volume or LUN of a data storage system included in a data center may be exposed to a host that is local to the data storage system whereby the host and the data storage system are included in the same data center. In this case in an embodiment in accordance with the ALUA standard, the unstretched volume is exposed to the host over at least one path from the data storage system to the host where the at least one path is active optimized. It should be noted that in some instances, under failure conditions, all active optimized paths may be off-line or unavailable whereby only active non-optimized paths remain as available. In this case, the active non-optimized path(s) may be used by the host.

Consistent with other discussion herein, depending on the data storage system implementation, only a single ALUA path within a local data center with respect to a host for a stretched volume may be active optimized such as illustrated in FIG. 7A. In contrast to the foregoing, alternatively, more than a single ALUA path within a local data center for a particular host may be active optimized for the stretched volume. However, in such embodiments consistent with other discussion herein, paths from a host to a remote data storage system and a remote data center for a remote copy of the stretched volume may be active non-optimized in order to make the host prefer to use local paths to the local copy of the stretched volume. It should be noted that while particular figures such as FIG. 7A may show just a single active optimized path for simplicity, in most real-life deployments, paths may between the host and a data storage system may have an associated access path state at the group level, such as based on a group of target ports as discussed elsewhere herein.

In connection with the data storage systems, or more particularly, the control path and management software of the data storage systems setting and modifying ALUA path states for exposed volumes or LUNs, the control path and management software of such systems may be configured with, and are aware of, the current topology of the metro cluster configuration. For example, the management software such as denoted by the elements 411 and 413 of FIGS. 7A and 7B know which hosts and data storage systems are local and included in the same data center, and which hosts and data storage systems are remote and included in different data centers. In this manner, the management software components 411, 413 respectively of the systems 410, 430 may communicate and cooperate to appropriately set ALUA path states and also ensure that both of the systems 410, 430 report the same information to the hosts 412, 432 for the exposed volumes or LUNs, such as the stretched LUN A configured from the volume pair 425a, 425b.

The foregoing and other aspects of the techniques herein are described in more detail in the following paragraphs.

In the following paragraphs, the techniques are described in embodiments in which a particular ALUA path state for a particular LUN is applied at the TPG level of granularity where all target ports in the same TPG have the same ALUA path state. In this case, all target ports in the TPG over which a LUN is exposed acquire the TPG ALUA path state. For example, setting a TPG to active optimized for an exposed LUN accordingly sets all target ports in the TPG to active optimized for the exposed LUN. As another example, setting a TPG to active non optimized for the exposed LUN accordingly sets all target ports in the TPG to active non optimized for the exposed LUN.

Also in the following paragraphs, each TPG ID and target port ID is 16 bits. Provided are examples where the extended ID range reserves the upper or most significant 4 bits and adds or masks off the upper 4 bits by setting such upper 4 bit to Fx (e.g., each of the 4 bits is set to 1) to convert an existing ID for a TPG or a target port to an extended ID. However, more generally, any suitable number of bits of the ID may be used and set to any suitable value denoting the extended ID range.

Figure 7C:
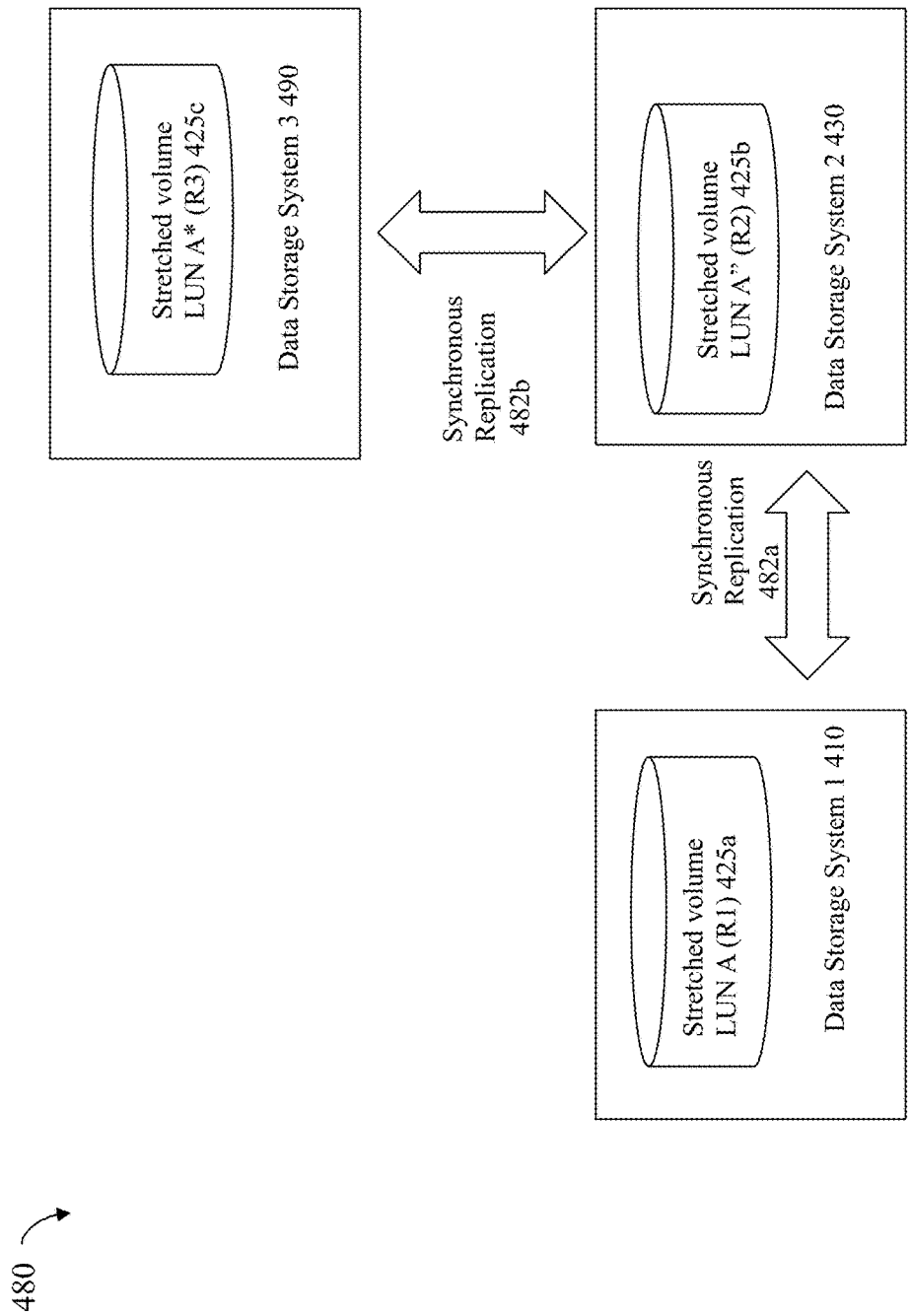
FIG. 7C is an example of a metro cluster configuration include three data storage systems in an embodiment in accordance with the techniques herein.

In the following paragraphs, a stretched volume is described as being stretched between and among two data storage systems included in a metro cluster configuration as described elsewhere herein, for example, such as in FIGS. 5 and 7A. More generally, a volume or LUN may be stretched between and among more than two data storage systems included in a metro cluster configuration. For example, with reference to FIG. 7C, the stretched volume A is configured from a first volume R1 LUN A 425a on the system 410 and a second volume R2 LUN A" 425b on the system 430, where the volumes 425a and 425b are configured to have the same identity, "LUN A", as presented to one or more hosts (not shown for simplicity of illustration). As discussed above such as in connection with FIG. 7A, the volumes 425a-b may be configured for two way synchronous remote replication in order to synchronize the content of the volumes 425a-b to be mirrors of one another.

The foregoing concept of a stretched volume or LUN may be extended to a third data storage system, the data storage system 3 (DS3) 490, that may also be included in the same metro cluster configuration whereby a third volume R3, LUN A* 425c on the DS3 490 is also configured to have the same identity as the volumes 425a-b. In this manner, paths from the one or more hosts to the third volume R3 425c on the DS3 490 are similarly viewed as additional paths to the same stretched volume or LUN. In such an embodiment, the volumes 425b-c may be configured to have two way synchronous replication of writes in a manner similar to the volumes 425a-b. In at least one embodiment, processing may be performed to maintain mirrored identical content on the volumes 425a-c in a synchronous manner whereby writes applied to any one of the volumes 425a-c may also be applied in a synchronous manner to the remaining ones of the volumes 425a-c. For example, a write may be received at the system 410 for the stretched volume copy 425a. The write to the volume 425a may be synchronously replicated to the system 430 and applied to the volume 425b, and also synchronously replicated from the system 430 to the system 490 and applied to the volume 425c.

In at least one embodiment, an acknowledgement may not be returned to the host that sent the originating write to the system 410 until the system 410 receives an acknowledgement, directly or indirectly, that both the systems 430 and 490 have completed the write such as by storing the write data in caches of the systems 430, 490. The example 480 illustrates a daisy-chain like arrangement for the stretched volume configured from the volumes 425a-c with the same identity. In such an arrangement for synchronous replication, a write from a host may be received at the system 410. In response, the write may be synchronously replicated from the system 410 to the system 430. The system 430 receiving the write may then synchronously replicate the write from the system 430 to the system 490. In response to receiving the write, the system 490 may return a first acknowledgement to the system 430. In response to receiving the first acknowledgement, the system 430 may return a second acknowledgement to the system 410. In response to receiving the second acknowledgement, the system 410 may then return a third acknowledgement to the host regarding completion of the write operation. Receiving this second acknowledgement notifies the system 410 that the write has been successfully replicated and stored in the systems 430 and 490. Other arrangements and configurations of stretched volumes across more than 2 data storage systems are also possible. In such other arrangements and configurations, the original data storage system 410 receiving the host write may only return an acknowledgment to the host regarding completion of the received write once the system 410 receives an acknowledgment, directly or indirectly, that all systems configured in the stretched LUN or volume configuration, have received and stored the write in their respective systems.

In such embodiments, the stretched LUN or volume is generally configured from M volume instances on M different data storage systems in a metro cluster configuration, where the M volume instances are configured as identical volumes and recognized by the host as the same volume or LUN, and where M is equal to or greater than 2. In such embodiments, there may be M−1 different extended attributes and ranges used in connection with the M volume instances. In other words, a different extended attribute with a different extended ID range may be associated with each of the M−1 remote volume instances. To further illustrate, consider the 3 volumes instances 425*a-c* configured as the same volume or LUN as in FIG. 7C. In this case, a first extended attribute 1 may be assigned to the volume 425*b* where all target port IDs and TPG IDs of the system 430 reported for the volume 425*b* may have all the upper or most significant 4 bits set to 1 (e.g., Fx) as discussed elsewhere herein. Additionally, a second extended attribute 2 may be assigned to the volume 425*c* where all target port IDs and TPG IDs of the system 490 reported for the volume 425*c* may have all the upper or most significant 4 bits set to a different value such as Ex (e.g., the bit pattern "1110"). Thus more generally, reserving the upper or most significant 4 bits for use in connection with represented potential extended ranges provides for a total of 15 different extended ranges for use with up to 15 remote volume instances on 15 data storage systems, where the 15 remote volume instances along with another "local" volume are configured as the same identical volume when exposed or presented to a host. Consistent with discussion herein, each of the different extended ranges may be specified by using a different one of 15 values (e.g., values in the range from 1x to Fx) set in the upper or most significant 4 bits of TPG IDs and target port IDs.

Thus, although the techniques described in the following paragraphs are illustrated with a metro cluster configuration and a stretched volume configured from two volumes on two data storage systems, more generally, the techniques herein may be further extended for use with a stretched volume configured from any suitable number of identically configured volumes on different data storage systems in the same metro cluster configuration.

Figure 8A:
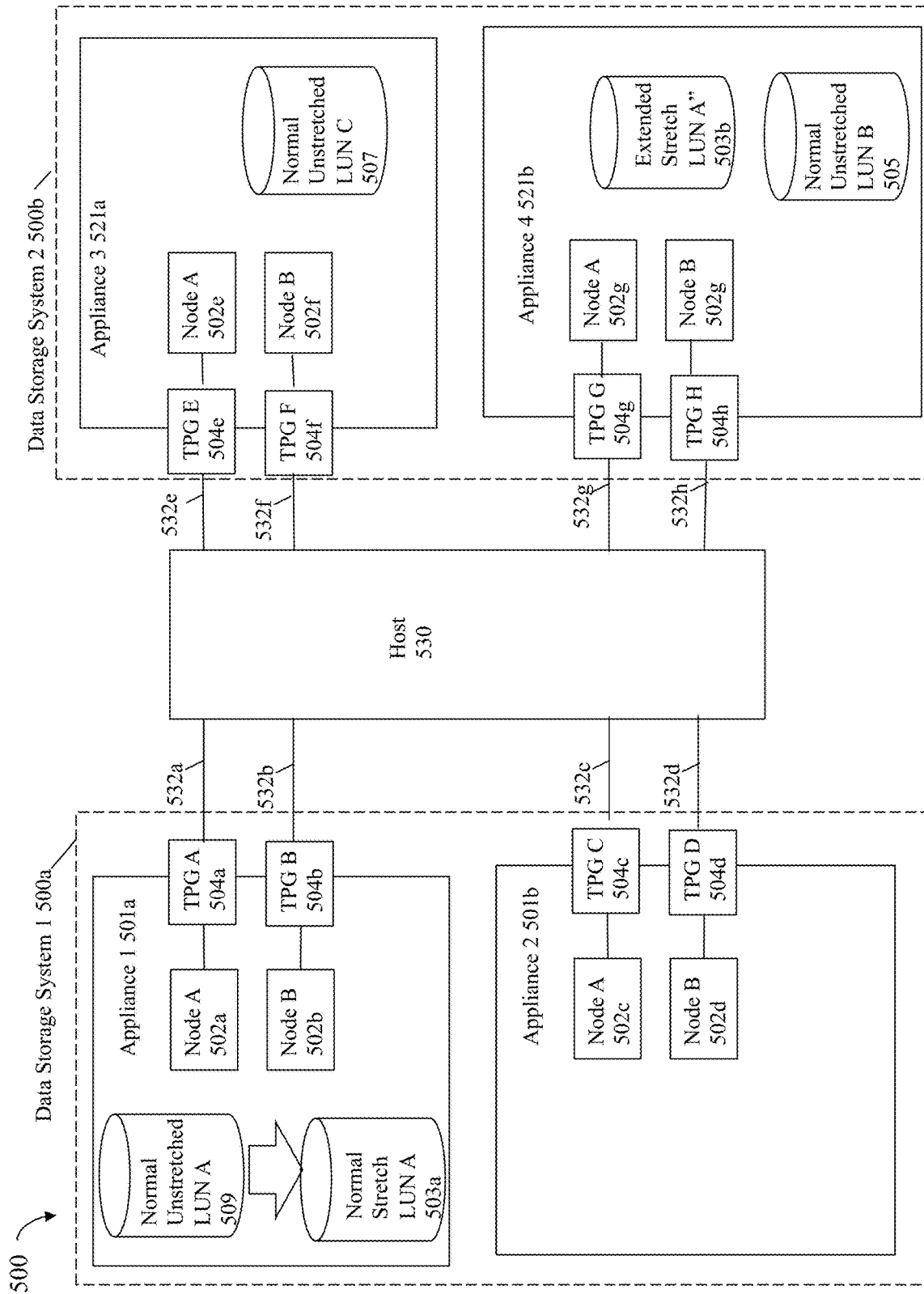

Referring to FIG. 8A, shown is an example 500 of a metro cluster configuration used in an embodiment in accordance with the techniques herein.

The example 500 includes a data storage system 1 (DS1) 500*a*, a data storage system 2 (DS2) 500*b* and a host 530. The DS1 500*a* includes two dual node appliances 501*a* and 501*b*, where each of the dual node appliances 501*a-b* are as described elsewhere herein. The appliance 501*a* includes the nodes 502*a-b* and the TPGs 504*a-b*. Each of the TPGs 504*a-b* may include multiple target ports omitted from the figure for simplification of illustration. The elements 532*a-b* each denote multiple paths from initiators of the host 530, respectively, to the TPGs 504*a-b*. The appliance 501*b* includes the nodes 502*c-d* and the TPGs 504*c-d*. Each of the TPGs 504*c-d* may include multiple target ports omitted from the figure for simplification of illustration. The elements 532*c-d* each denote multiple paths from initiators of the host 530, respectively, to the TPGs 504*c-d*.

The DS2 500*b* includes two dual node appliances 521*a* and 521*b*, where each of the dual node appliances 521*a-b* are as described elsewhere herein. The appliance 521 includes the nodes 502*e-f* and the TPGs 504*e-f*. Each of the TPGs 504*e-f* may include multiple target ports omitted from the figure for simplification of illustration. The elements 532*e-f* each denote multiple paths from initiators of the host 530, respectively, to the TPGs 504*e-f*. The appliance 521*b* includes the nodes 502*g-h* and the TPGs 504*g-h*. Each of the TPGs 504*g-h* may include multiple target ports omitted from the figure for simplification of illustration. The elements 532*g-h* each denote multiple paths from initiators of the host 530, respectively, to the TPGs 504*g-h*.

For purposes of illustration as discussed below, assume that both the DS1 500*a* and the DS2 500*b* are configured and initialized to use the same set of target port IDs and TPG IDs. However, note that the techniques herein may be used in connection with data storage system that may be configured to have not have exactly the same sets of IDs as discussed below. More generally, the systems 500*a*, 500*b* may both be configured to have at least one of the same TPG IDs and at least one of the same target port IDs.

In connection with this example of FIG. 8A, assume the TPGs and target ports of such TPGs in the DS1 500*a* and the DS2 500*b* are configured and initialized as in the Table 1 below to have the following IDs which are represented in hexadecimal (hex or base 16) notation:

TABLE 1

| | Physical TPG: | | | | | | | |
|---|---|---|---|---|---|---|---|---|
| | TPG A | TPG B | TPG C | TPG D | TPG E | TPG F | TPG G | TPG H |
| TPG ID: | 0001 | 0002 | 0003 | 0004 | 0001 | 0002 | 0003 | 0004 |
| Target port ID range: | 0021-0030 | 0031-0040 | 0041-0050 | 0051-0060 | 0021-0030 | 0031-0040 | 0041-0050 | 0051-0060 |

Assume that the IDs of Table 1 define the base or starting set of TPG IDs and target port IDs for all exposed LUNs or volumes, collectively, of the DS1 500*a* and the DS2 500*b*. In particular, consistent with FIG. 8A, the TPGs A-D and associated target port ranges are included in the initial configuration of the DS 1 500*a*; and the TPGs E-H and associated target port ranges are included in the initial configuration of the DS 2 500*b*.

What will now be described is performing a stretch operation to an existing unstretched volume or LUN. At a first point in time P1, the element 509 may denote a normal unstretched LUN A initially created on the DS1 500*a*. The volume or LUN 509 when created has the normal attribute and the unstretched attribute. In this case at the time P1, information reported about the LUN A 509 to the host 530 may use TPG IDs and target port IDs as originally configured in the Table 1 where such TPG IDs and target port IDs may be in the normal range. Additionally at the time P1, the ALUA path states for the LUN 509 may be active optimized for the paths 532a from the TPG 504a, active non optimized for the paths 532b from the TPG 504b, and no paths existing from any of the remaining TPGs 504c-h. Thus, the LUN 509 may be exposed to the host 530 over only the paths 532a, 532b whereby the paths 532a are active optimized and the paths 532b are active non optimized.

At a second point in time P2 subsequent to the time P1, assume a stretch operation is performed on the LUN A 509 to stretch the LUN A 509 from the DS 1 500a to the DS2 500b. The LUN A 503a and the LUN A 503b may denote, respectively, the R1 and R2 volumes configured on the systems 500a, 500b to have the same identity from the point of view of the host 530. In connection with the stretch operation of the LUN A 509, processing is performed to modify the attributes of the LUN A 509 from normal and unstretched to normal and stretched as denoted by the LUN A 503a. Thus, the element 503a represents the attributes of the LUN A at the time P2. Additionally, processing performed in connection with the stretch operation may include creating the counterpart remote volume or LUN A" 503b on the DS2 500b, where the volume or LUN A 503b has the attributes of extended and stretched. In connection with reporting information regarding the stretched LUN A configured with the two volumes 503a, 503b having the same identity to the host 530, the IDs of the TPGs 504a-d and the IDs of target ports included in the TPGs 504a-d are reported as originally configured in the Table 1 above. For the extended stretched LUN A" 503b on the DS2 500b, all the IDs of the TPGs 504e-h and all the IDs for the target ports included in the TPGs 504e-h are converted or mapped to corresponding IDs in the extended ID range. In this example, the foregoing IDs for the stretched LUN A" 503b may be determined by masking off or setting the upper 4 most significant bits to Fx whereby each of the upper 4 most significant bits are set to 1.

One important aspect to note is that the extended TPG IDs and extended target port IDs exposing a volume or LUN are dynamically assigned and bound, respectively, to TPGs and target ports. As discussed above in connection with FIG. 8A and also below in connection with FIG. 8B, the extended IDs are determined and bound to TPGs and target ports for an exposed LUN or volume at the time the exposed LUN or volume is stretched using the stretch command or operation.

Figure 8B:
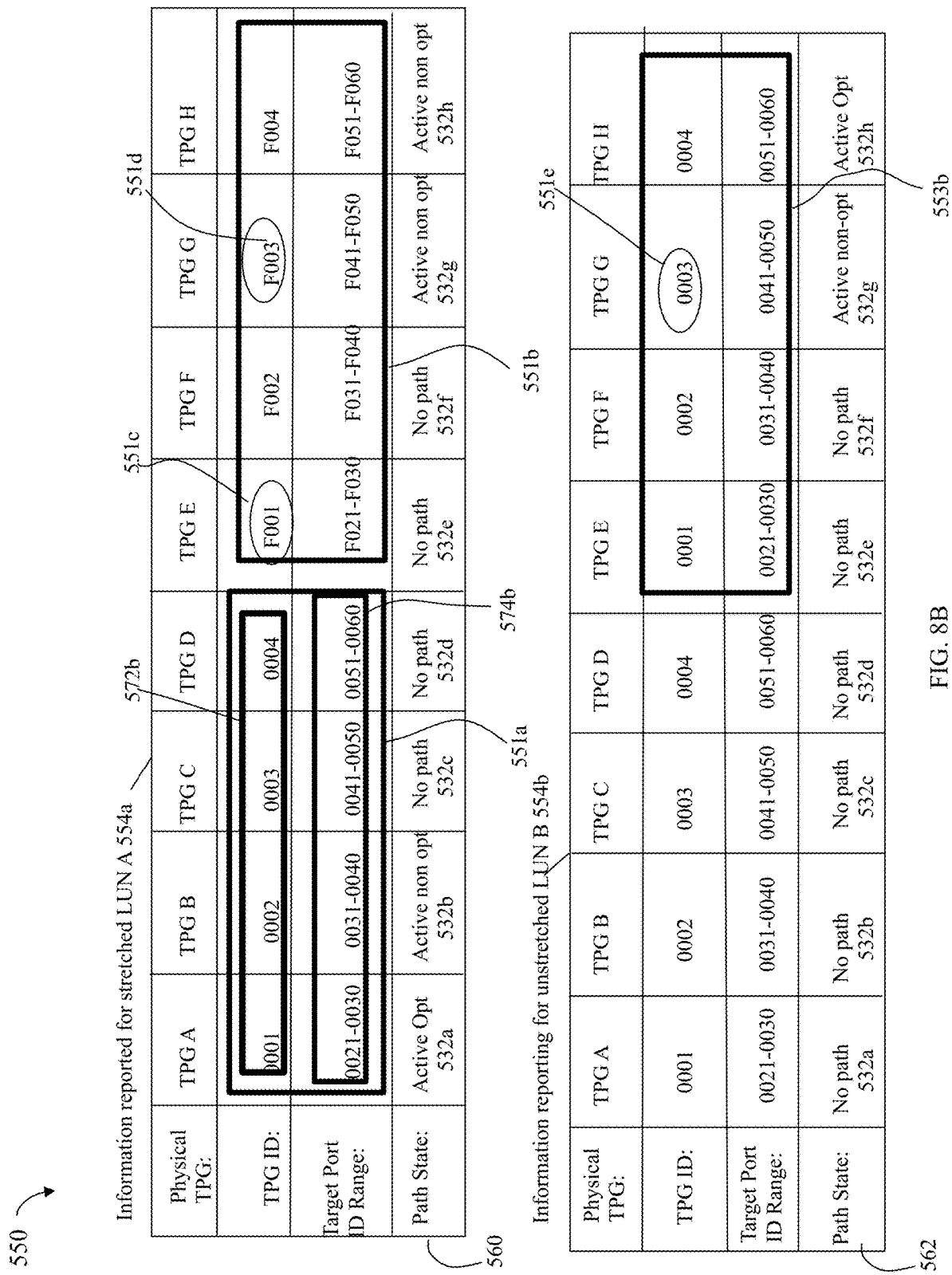

Referring to FIG. 8B, shown are tables of information that may be reported to the host 530 in an embodiment in accordance with the techniques herein. In particular, the table 554a denotes information reported to the host 530 regarding the stretched LUN A at the time P2 after completing the stretch operation. In particular, the element 551a denotes the TPG IDs and the target port IDs as reported to the host 530 for the R1 copy 503a of the stretched LUN A on the DS1 500a, and the element 551b denotes the TPG IDs and the target port IDs as reported to the host 530 for the R2 copy 503b of the stretched LUN A on the DS2 500b. The IDs in the element 551a are in the normal ID range in accordance with the normal attribute of the volume 503a. The IDs in the element 551a are reported as in the original configuration of the Table 1 discussed above for the TPGs 504a-d and the target port ranges included in the TPGs 504a-d.

The IDs in the element 551b are in the extended ID range in accordance with the extended attribute of the volume 503b. In particular the IDs in the element 551b may be determined by converting the TPG IDs for the TPGs 504e-h and converting the target port IDs for the TPGs 504e-h from their original IDs from the Table 1 to extended IDs as discussed above. In this embodiment, an original normal ID from the Table 1 may be converted or mapped to a corresponding extended ID by setting the highest or most significant 4 bits to Fx where each of the 4 most significant bits are set to 1. For example, Table 1 above indicates that the original TPG ID for TPG E is 0001x which is converted or mapped to the extended TPG ID F001x (as denoted by the element 551c in the table 554a. In a similar manner, the extended IDs for the TPGs E-H and associated target port ranges included in the element 551b may be determined as a result of converting or mapping corresponding original IDs, respectively, for the TPGs E-H and associated target port ranges from the Table 1. For example, the TPG IDs for the TPGs E-H in the Table 1 above are respectively 0001x, 0002x, 0003x and 0004x which are converted or mapped, respectively, to the extended TPG IDs F001x, F002x, F003x and F004x (as included in the element 551b). For example, the target port ID ranges for the TPGs E-H in the Table 1 above are respectively 0021x-0030x, 0031x-0040x, 0041x-0050x, and 0051x-0060x, which are converted or mapped, respectively, to the extended target port ID ranges F021x-F030x, F0031x-F040x, F041x-F050x, and F051x-F060x (as included in the element 551b).

The row 560 of the table 554a denotes the ALUA path state information reported to the host 530 for the stretched LUN A at the time P2. As indicated by the row 560: the paths 532a to the LUN A copy 503a are active optimized indicating the DS 1 500a and the host 530 may be local and included in the same data center; the paths 532g-h to the LUN A" copy 503b are active non optimized indicating the DS2 500b and the host 530 may be remote and located in different data centers; and the paths 532b are active non optimized. The row 560 indicates that the stretched LUN A is not exposed over any of the paths 532c-f as denoted by the "no path" indications for 532c-f.

In at least one embodiment in accordance with the SCSI standard, commands such as a report target port group (RTPG) command and an inquiry command may be issued by the host 530 to return information regarding a particular LUN, such as the stretched LUN A configured from the volumes 503a-b in the metro cluster configuration. In at least one embodiment, commands such as the foregoing issued by the host 530 to the data storage systems 500a, 500b may result in reporting information about the requested LUN A. The information returned and reported may be as described in connection with the table 554a for the LUN A. In particular, the commands may result in reporting information for the LUN A for existing paths, TPGs and target ports over which the LUN A (e.g., volumes 503a-b) is exposed to the host 530. In at least one embodiment, the information reported or returned in response to such commands may omit any TPG and target ports for which there is no path to the LUN A. For example with reference to the table 554a, the reported information sent to the host may include information from the table 554a for the paths 532a, 532b, 532g and 532h. In particular the reported information may identify the TPGs 504a, 504b, 504g and 504h and the target port ID ranges of such TPGs, and may include the ALUA path states for the paths 532a, 532b, 532g and 532h. Information may be stored in management DBs of the systems 500a and 500b indicating that the TPG IDs and target port IDs as denoted by the elements 551a and 551b of the table 554a are allocated for use with the stretched LUN A when the systems are as described above in connection with FIG. 8A.

Also shown in the FIG. 8A is a normal unstretched LUN B 505 configured on the DS2 500b. The LUN B 505 may be created at the time P1. The table 554b denotes information reported to the host 530 regarding the LUN B 505 at either the time P1 or the time P2. At either point in time, the information 554b reported to the host 530 for the volume 505 is the same in this example. In particular, due to the normal attribute setting of the LUN B 505, the information in the table 554b reports the same TPG IDs and target port IDs for the LUN B 505 as in the original configuration represented by the Table 1.

The row 562 of the table 554b denotes the ALUA path state information reported to the host 530 for the LUN B 505. As indicated by the row 562, the LUN B 505 is exposed to the host 530 over the paths 532g-h where the paths 532g are active non optimized and the paths 532h are active optimized. The LUN B 505 is not exposed of any of the other remaining paths 532a-f as denoted by the "no path" indications for 532a-f in the row 562.

The information returned and reported to the host 530 in response to commands such as the SCSI RTPG and inquiry command regarding the LUN B may be as described in connection with the table 554b. In particular, the commands may result in reporting information for the LUN B for existing paths, TPGs and target ports over which the LUN B 505 is exposed to the host 530. In at least one embodiment, the information reported or returned in response to such commands may omit any TPG and target ports for which there is no path to the LUN B 505. For example with reference to the table 554b, the reported information sent to the host regarding the LUN B 505 may include information from the table 554b for the paths 532g and 532h. In particular the reported information may identify the TPGs 504g and 504h and the target port ID ranges of such TPGs, and may include the ALUA path states for the paths 532g and 532h.

Information may be stored in a management DB of the system 500b indicating that the TPG IDs and target port IDs as denoted by the element 553b of the table 554b of FIG. 8B are allocated for use with the LUN B when the systems are as described above in connection with FIG. 8A.

One point to note is that the same physical TPGs and the same physical target ports may be mapped to different IDs that are reported for different volumes or LUNs. For example, the element 551b denotes a first set of IDs reported for the volume 503b (one of the volumes configured as the stretched LUN A) for the TPGs E-H and the target ports in the TPGs E-H. The element 553b denotes a second different set of IDs reported for the unstretched LUN B 505 for the same TPGs E-H and the same target ports in the TPGs E-H. In this case, for example, the same physical TPG such as TPG G may be mapped to a first TPG ID=F003x (551d) when reporting information about the stretched LUN A, and may be mapped to a second different TPG ID=0003x (551e) when reporting information about the LUN B 505.

The DS2 500b may also include a normal unstretched LUN C 507. The LUN C 507 may be created at the time P1. The table 570 of the FIG. 8C denotes information reported to the host 530 regarding the LUN C 507 at either the time P1 or the time P2. At either point in time in this example, the information 570 reported to the host 530 for the volume or LUN C 507 is the same. In particular, due to the normal attribute setting of the LUN C 507, the information in the table 570 reports the same TPG IDs and target port IDs for the LUN C 507 as in the original configuration represented by the Table 1.

The row 575 of the table 570 denotes the ALUA path state information reported to the host 530 for the LUN C 507. As indicated by the row 575, the LUN C 507 is exposed to the host 530 over the paths 532e-f where the paths 532e are active non optimized and the paths 532f are active optimized. The LUN C 507 is not exposed of any of the other remaining paths 532a-d and 532g-h as denoted by the "no path" indications in the row 575.

The information returned and reported regarding the LUN C 507 may be as described in connection with the table 570 of FIG. 8C. In particular, the commands may result in reporting information for the LUN C 507 for existing paths, TPGs and target ports over which the LUN C is exposed to the host 530. In at least one embodiment, the information reported or returned in response to such commands may omit any TPG and target ports for which there is no path to the LUN C. For example with reference to the table 570 for the LUN C, the reported information sent to the host may include information for the paths 532e-f. In particular the reported information may identify the TPGs 504e-f and the target port ID ranges of such TPGs, and may include the ALUA path states for the paths 532e-f.

Information may be stored in a management DB of the system 500b indicating that the TPG IDs and target port IDs as denoted by the elements 572a and 574a of FIG. 8C are allocated for use with the LUN C 507 when the systems are as described above in connection with FIG. 8A.

One point to note in connection with the table 570 of information reported for the LUN C 507 in comparison to the table 554a of information reported for the stretched LUN A is that two different physical TPGs may have the same TPG ID but where one of the physical TPGs is reported for the LUN C 507 as having the TPG ID, and a different physical TPG is reported for the stretched LUN A as having the same TPG ID. For example, the element 572a of FIG. 8C denotes that the TPGs E-H respectively have the TPG IDs 0001x, 0002x, 0003x and 0004x when reporting information for the LUN C 507. In contrast, the element 572b of FIG. 8B denotes that the TPGs A-D respectively have the TPG IDs 0001x, 0002x, 0003x and 0004x when reporting information for the volume copy 503a of the stretched LUN A.

In a similar manner, two different physical target ports may have the same target port ID but where one of the physical target ports is reported for the LUN C 507 as having the target port ID and a different physical target port is reported for the stretched LUN A as having the same target port ID. For example, the element 574a of FIG. 8C denotes that the target port IDs for the target port ranges of the TPGs E-H respectively have the target port ID ranges 0021x-0030x, 0031x-0040x, 0041x-0050x, and 0051x-0060x when reporting information for the LUN C 507. In contrast, the element 572b of FIG. 8B denotes that the target port IDs for the target port ranges of the TPGs E-H respectively have the target port ID ranges 0021x-0030x, 0031x-0040x, 0041x-0050x, and 0051x-0060x when reporting information to the host 530 for the stretched LUN A.

As described above in connection with stretching the LUN A from the DS1 500a to the DS 2 500b, the techniques herein may be characterized in at least one embodiment as applying a masking algorithm to convert or map existing TPG IDs and existing target port IDs (in the normal ID range) to corresponding extended IDs reported to the host 530 for the stretched LUN A configured from the volumes 503a, 503b to have the same identity when presented to the host 530. In the example of FIG. 8A, the volume or LUN A 503a is stretched from the DS1 500a to the DS2 500b, where the corresponding remote counterpart volume 503b is configured on the DS2 500b. In this example, the masking algorithm is applied to target port IDs and TPG IDs of the DS2 500b exposing the remote counterpart volume 503b (e.g., the remote target of the stretching operation), where the masking algorithm converts or maps each existing TPG ID and target port ID of the DS2 500b with respect to the volume 503b to a corresponding extended ID by masking off or setting the highest, most significant 4 bits to the particular value Fx. The masking algorithm may be used to convert or map existing TPG IDs and target port IDs in data storage systems initially configured and allocated with any method. The existing TPG IDs and target port IDs may be initially configured and assigned as discussed elsewhere herein. The existing TPG IDs and target port IDs may be included a specified normal ID range that is generally a subrange or portion of all possible or allowable IDs for TPGs and target ports. Subsequently, the techniques herein may be used to apply a masking algorithm to convert or map the existing TPG IDs and target port IDs of the normal ID range to corresponding IDs in an extended ID range. In at least one embodiment, the extended ID range may be those IDs having the highest most significant 4 bits of each ID set to Fx. The normal ID range and the extended ID range may be mutually exclusive with no overlap.

What will now be described is a second use case or scenario illustrating an unstretch operation. In particular, the unstretch operation in the following example is applied to the stretched LUN A configured from the volumes 503a, 503b in the metro cluster configuration of FIG. 8A. Assume, for example, the unstretch operation is applied to the stretched LUN A at a time P3 subsequent to P2. Note the subsequent figures and examples are further operations performed with respect to the stretched LUN A configured from volumes 503a and 503b.

Figure 9A:
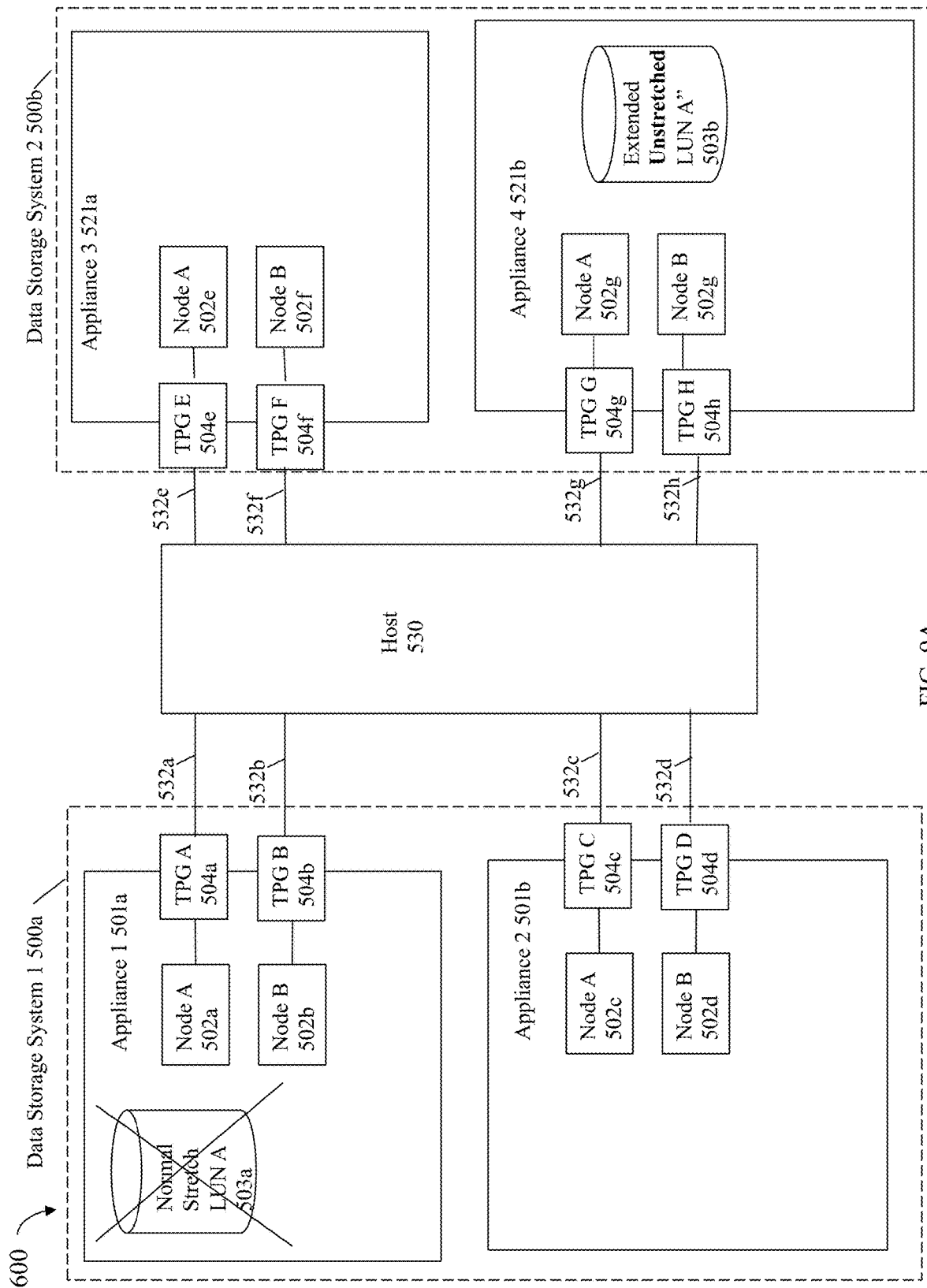

With reference to FIG. 9A, the example 600 illustrates the results of unstretching the stretched volume A whereby the stretched volume transitions to a local volume on only one of the data storage systems 500a, 500b in the metro cluster configuration. For example, consider a case where the unstretch operation is applied to the stretched LUN A as described in connection with the FIG. 8A above. In particular, the unstretch operation is applied to one of the volumes 503a, 503b so that the particular volume will remain a local volume on one data storage system and the remaining counterpart volume is removed or deleted from the remote counterpart data storage system. For example, the unstretch operation may be applied to the volume 503b on the DS2 500b whereby the volume 503b remains as a local unstretched volume and the remaining remote counterpart volume 503a on the DS1 500a is removed or deleted. Unstretching in this example 600 may include removing or deleting the remote counterpart volume 503a on the DS1 500a. Unstretching in this example 600 may also include modifying the attributes of the volume 503b from stretched to unstretched. Additionally, it is noted that the volume 503b retains its extended attribute so that extended IDs for the TPG IDs and the target port IDs for the volume 503b, presented as the LUN A to the host 530, continue to be reported and used in connection with the LUN A volume 503b. The retention of the extended IDs for the TPG IDs and target port IDs of the volume 503b is necessary since such extended IDs are currently known and in use by the host 530 to send I/Os to the volume 503b.

Referring to FIG. 9B, shown is an example 650 of information that may be reported to the host 530 regarding the LUN A 503b after completing the unstretch operation as described above in connection with FIG. 9A. The IDs for the TPGs and target ports as denoted by 551a and 551b for the LUN A remain unchanged and as prior to performing the unstretch operation. In particular, the IDs of 551a and 551b in the table 650 of FIG. 9B match the IDs of 551a and 551b in the table 554a of FIG. 8B. Thus, the volume 503b configured as LUN A is local to the DS2 500b and remains using the extended TPG IDs and extended target port IDs for paths from between the host 530 and the DS2 500b.

The row 655 denotes the ALUA path state information reported for the LUN A (e.g., volume copy 503b) to the host 530 after performing the unstretch operation as described in connection with FIG. 9A. As indicated by the "no path" designation in the row 655 for the path states of 532a-e, the remote paths to the LUN A on the DS 1 500a are non-existent (no path) since there is no longer the volume 503a on the DS1 500a. As also indicated by the row 655, the volume 503b configured as the LUN A is exposed over the paths 532g-h where the paths 532g are active optimized and the paths 532 are active non optimized. Additionally, the row 655 indicates that the volume 503b configured as the LUN A is not exposed (no path designation) over the paths 532e-f.

The information returned and reported may be as described in connection with the table 650 for the LUN A now configured as the local volume 503b of the DS2 500b. In particular, the commands may result in reporting information for the LUN A as volume 503b for existing paths, TPGs and target ports over which the LUN A (e.g., volume 503b) is exposed to the host 530. In at least one embodiment, the information reported or returned in response to such commands may omit any TPG and target ports for which there is no path to the volume 503b configured as the LUN A. For example with reference to the table 650, the reported information sent to the host for the volume 503b configured as the LUN A may include information for the paths 532g and 532h. In particular the reported information for the LUN A now configured as the sole volume 503b may identify the TPGs 504g and 504h and the target port ID ranges of such TPGs, and may include the ALUA path states for the paths 532g and 532h.

Information may be stored in a management DB of the system 500b indicating that the TPG IDs and target port IDs as denoted by the element 551b of FIG. 9B are allocated for use with the LUN A when the systems are as described above in connection with FIG. 9A.

What will now be described is a third use case or scenario illustrating another stretch operation. In particular, the stretch operation in the following example is applied to the unstretched LUN A configured from the 503b in the metro cluster configuration of FIG. 9A. Assume, for example, the stretch operation is applied to the unstretched extended LUN A at a time P4 subsequent to P3. In connection with this third use case, the volume or LUN A was originally an unstretched volume that was stretched (as described in connection with FIG. 9A), and then subsequently unstretched (as described in connection with FIG. 10A). Now, in connection with this third use case, processing is performed to restretch the volume or LUN A once again. Additionally, in this third scenario described below, the volume or LUN A is being stretched from the DS2 500b to a new or different data storage system, DS 3.

Figure 10A:
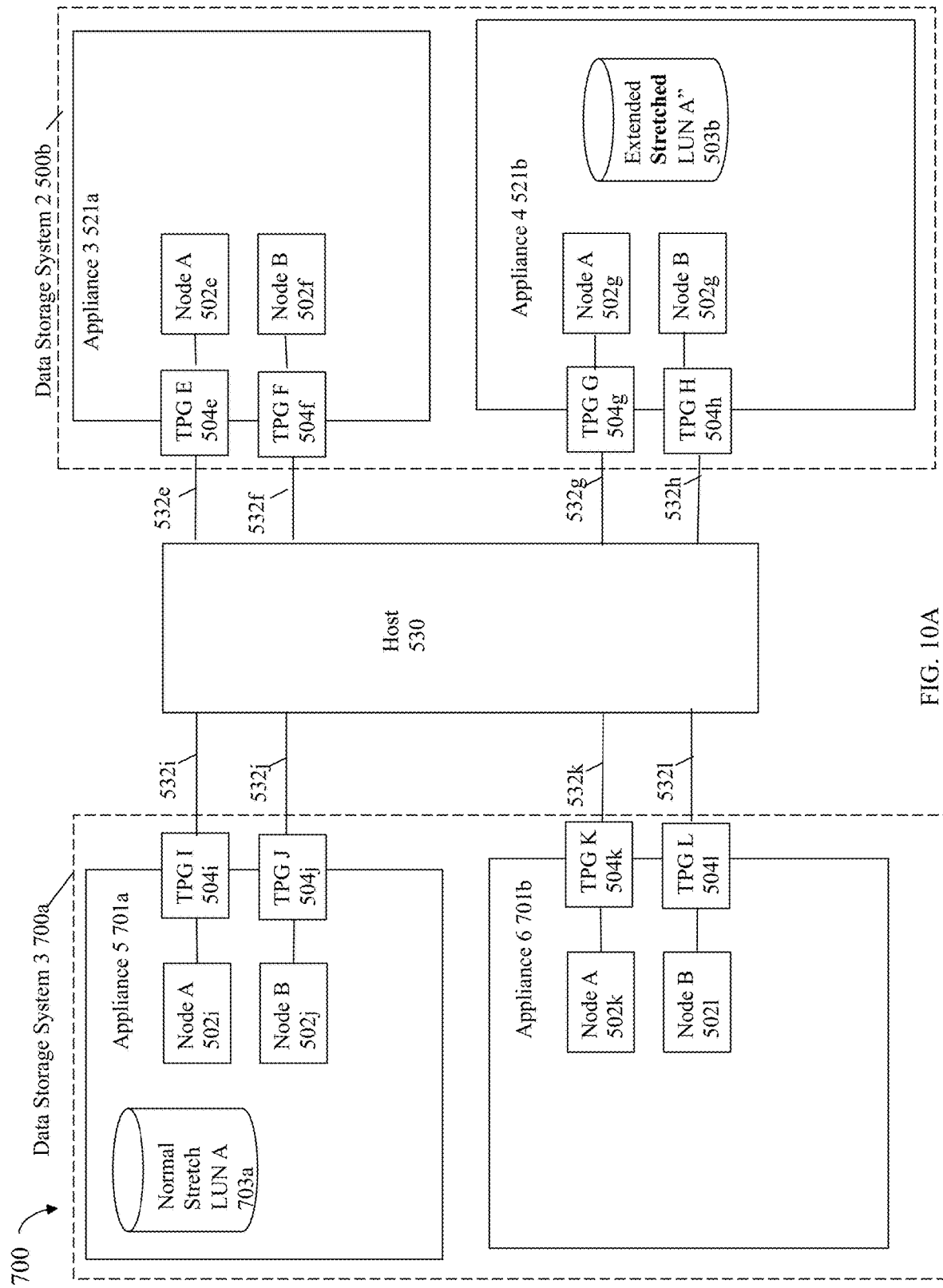

With reference to FIG. 10A, the example 700 illustrates the results of stretching the extended unstretched volume A from the FIG. 9A whereby the volume 503b has its attribute modified from unstretched to stretched. The volume 503b retains its extended attribute.

The example 700 includes the DS2 500b and the new DS3 700a. The DS 3 700a includes the appliances 701a-b. The appliance 701a includes the nodes 502i-j and the TPGs 504i-j. The appliance 701b includes the nodes 502k-1 and the TPGs 504k-1. The elements 532i-1 denote paths from the host 530. In particular, the paths 532i-1 respectively denote the paths from the TPGs 504i-1 to the host 530.

The following Table 2 denotes the IDs for the TPGs and target ports as configured and initialized for the DS 3 700a:

TABLE 2

| Physical TPG: | TPG I | TPG J | TPG K | TPG L |
|---|---|---|---|---|
| TPG ID: | 0001 | 0002 | 0003 | 0004 |
| Target port ID range: | 0021-0030 | 0031-0040 | 0041-0050 | 0051-0060 |

Thus, as can be seen from the Table 2 and the Table 1 discussed above, the new DS3 700a is configured and initialized in a manner similar to DS 1 500a to use the same TPG IDs and target port IDs as the DS 2 500b. Assume that the IDs of Table 2 define the base or starting set of TPG IDs and target port IDs for all exposed LUNs or volumes of the DS 3 700a.

The stretch operation is performed on the LUN A or volume 503b to stretch the LUN A 503b from the DS 1 500a to the DS3 700a. The volumes 503b and 703a may denote, respectively, the R1 and R2 volumes configured as the same LUN A on the systems 500b, 700a to have the same identity from the point of view of the host 530. In connection with the stretch operation of the volume 503b, processing is performed to modify the attributes of the volume 503b from unstretched to stretched. Additionally, processing performed in connection with the stretch operation may include creating the counterpart remote volume or LUN A 703a on the DS3 700a, where the volume 703a has the attributes of normal and stretched. In this example 700, the originating volume 503b that is stretched already has the extended attribute set. Therefore the remote counter part volume 703a is configured to have the opposing normal attribute set and thereby use a different set and range of IDs for target port IDs and TPG IDs as compared to the extended target port IDs and extended TPG IDs used in connection with reporting information on the volume 503b. More generally, when stretching an originating volume such as 503b, the originating volume's attributes are examined to determine whether it has the attribute setting of normal or extended. If the volume 503b is normal, then the remote counterpart volume such as 700b has its attribute set to extended (e.g., the opposite or remaining one of the two foregoing attributes of normal and extended not assigned to the originating volume 503b). If the volume 503b is extended, then the remote counterpart volume such as 700b has its attribute set to normal (e.g., the opposite or remaining one of the two foregoing attributes of normal and extended not assigned to the originating volume 503b). Thus, in this example 700 for the volume 503b having the extended attribute set, the masking algorithm is used to convert or map the originally configured target port IDs and TPG IDs of the DS2 500b as in the Table 1 discussed above to extended target port IDs and extended TPG IDs each having the upper 4 bits set to the value Fx. In contrast, the originally configured target port IDs and extended TPG IDs of Table 2 are used in connection with reporting information regarding the volume 703a having the normal attribute set.

In connection with reporting information regarding the stretched LUN A configured with the two volumes 503b, 700a having the same identity to the host 530, the IDs of the TPGs 504i-1 and the IDs of target ports included in the TPGs 504i-1 (e.g., of DS 3 700a) are reported as originally configured in the Table 2 above. For the extended stretched LUN A" 503b on the DS2 500b, all the IDs of the TPGs 504e-h and all the IDs for the target ports included in the TPGs 504e-h (e.g., of DS 2 500b) are converted or mapped to corresponding IDs in the extended ID range. In this example, the foregoing IDs for the stretched LUN A" 503b may be determined by masking off or setting the upper 4 most significant bits to Fx whereby each of the upper 4 most significant bits are set to 1.

Referring to FIG. 10B, shown is an example 750 of information that may be reported to the host 530 regarding the stretched LUN A configured using the volume pair 503b, 703a after completing the stretch operation as described above in connection with FIG. 10A. The IDs for the TPGs and target ports as denoted by 751b for the volume 503b configured as the LUN A remain unchanged and as prior to performing the stretch operation. In particular, the IDs of 751b in the table 750 of FIG. 10B match the IDs of 551b in the table 650 of FIG. 9B. Thus, the volume 503b configured as LUN A is local to the DS2 500b and remains using the extended TPG IDs and extended target port IDs for local paths from the host 530 to the DS2 500b. The element 751a denotes the TPG IDs and target port IDs used for the volume 703a configured as the LUN A. Due to the normal attribute setting for the volume 703a, the IDs of 751a correspond to those IDs in the original configuration of the DS 3 700a.

The row 755 denotes the ALUA path state information reported for the LUN A to the host 530 after performing the stretch operation as described in connection with FIG. 10A. The "no path" designation in the row 755 for the path states of 532k-1 and 532 e-f, indicates that such paths to the LUN A are non-existent. As also indicated by the row 755, the volume 503b configured as the LUN A is exposed over the paths 532g-h where the paths 532g are active optimized and the paths 532 are active non optimized. Additionally, the row 655 indicates that the volume 700a configured as the remote counterpart for the LUN A that is remote from the host 530 has the paths 532i-j configured as active non optimized.

Information may be stored in management DBs of the systems 500b and 700a indicating that the TPG IDs and target port IDs as denoted by the elements 571a-b of FIG. 10B are allocated for use with the "restretched" LUN A when the systems are as described above in connection with FIG. 10A.

The information returned and reported may be as described in connection with the table 750 for the LUN A using the volumes 503b, 700a configured as the same LUN having the same identity when exposed to the host 530. In particular, the commands may result in reporting information for the LUN A as the volumes 503b, 700a for existing paths, TPGs and target ports over which the LUN A (e.g., volumes 503b and 700a) is exposed to the host 530. In at least one embodiment, the information reported or returned in response to such commands may omit any TPG and target ports for which there is no path to the volume 503b or 700a configured as the LUN A. For example with reference to the table 750, the reported information sent to the host for the volume 503b configured as the LUN A may include information for the paths 532g and 532h. In particular the reported information for the stretched LUN A now configured as the volumes 503b and 700a may identify the TPGs 504g-j and the target port ID ranges of such TPGs, and may include the ALUA path states for the paths 532g-j.

In at least one embodiment in accordance with the SCSI standard with reference back to the FIGS. 8A-C, a command such as the RTPG or inquiry command, may be sent to either DS 1 500a or DS 2 500b requesting that the particular data storage system receiving the command report information regarding an exposed volume or LUN. The command may be sent from the host to a data storage system over a path on which a particular LUN or volume is exposed to the host in order to request information about the particular LUN or volume. In connection with the arrangement of FIG. 8A, such a command may be sent from the host 530 to the DS1 500a, such as over one of the paths belonging to 532a or 532b, or sent from the host 530a to the DS 2 500b, such as over one of the paths belonging to 532g or 532h, to request information regarding the "LUN A". In this example, the host recognizes the volumes 503a, 503b as the same configured volume or LUN, "LUN A". Both the DS1 500a and the DS2 500b return the same set of information regarding the particular paths, target ports and TPGs over which the LUN A (the stretched LUN A configured using volumes 503a, 503b) is exposed to the host 530. In this case regarding the stretched LUN A, the DS1 500a and the DS2 500b return information as discussed above in connection with the table 554a FIG. 8B. Management software of the DS 1 500a and the DS 2 500b may communicate with one another to coordinate by exchanging and storing information as discussed herein regarding the stretched volume or LUN A configured from the volumes 503a and 503b to ensure that both such systems report the same information about the stretched volume or LUN A. Information may be stored in the management DBs of the systems 500a and 500b indicating that the TPG IDs and target port IDs as denoted by the elements 551a-b of FIG. 8B are allocated for use with the stretched LUN A when the systems are as described above in connection with FIG. 8A.

In connection with the arrangement of FIG. 8A, a command such as the RTPG or inquiry command may be sent from the host 530 to the DS 2 500b, such as over one of the paths belonging to 532g or 532h, to request information regarding the "LUN B" 505. In this case the DS2 500b returns information as discussed above in connection with the table 554b of FIG. 8B. It should be noted that if the RTPG or inquiry command requesting information regarding the LUN B 505 is sent from the host 530 to the DS1 500a, no information is returned as the LUN B 505 is not located on the DS1 500a. Rather, since the LUN 505 is unstretched and local only to the DS 2 500b, the LUN B 505 is only known or defined on the DS 2 500b. Information may be stored in a management DB of the system 500b indicating that the TPG IDs and target port IDs as denoted by the element 553b of FIG. 8B are allocated for use with the LUN B 505 when the systems are as described above in connection with FIG. 8A.

In connection with the arrangement of FIG. 8A, a command such as the RTPG or inquiry command may be sent from the host 530 to the DS 2 500b, such as over one of the paths belonging to 532e or 532f, to request information regarding the "LUN C" 507. In this case the DS2 500b returns information as discussed above in connection with the table 570 of FIG. 8C. It should be noted that if the RTPG or inquiry command requesting information regarding the LUN C 507 is sent from the host 530 to the DS1 500a, no information is returned as the LUN C 507 is not located on the DS1 500a. Rather, since the LUN C 507 is unstretched and local only to the DS 2 500b, the LUN C 507 is only known or defined on the DS 2 500b. Information may be stored in a management DB of the system 500b indicating that the TPG IDs and target port IDs as denoted by the elements 572a and 574a of FIG. 8C are allocated for use with the LUN C 507 when the systems are as described above in connection with FIG. 8A.

In connection with the arrangement of FIG. 9A, a command such as the RTPG or inquiry command may be sent from the host 530 to the DS 2 500b, such as over one of the paths belonging to 532g or 532h, to request information regarding the "LUN A" configured as the unstretched volume 503b. In this case the DS2 500b returns information as discussed above in connection with the FIG. 9B. It should be noted that if the RTPG or inquiry command requesting information regarding the LUN A is sent from the host 530 to the DS1 500a at this point in time where the systems are as illustrated in the FIG. 9A, no information is returned as the LUN A, volume 503b, is not located on the DS1 500a. Rather, since the LUN A was unstretched resulting in removing the volume 503a from the DS1 500a, LUN A is now configured as an unstretched volume that is local only to the DS 2 500b. Thus, the LUN A (as volume 503b) is only known or defined on the DS 2 500b. Information may be stored in a management DB of the system 500b indicating that the TPG IDs and target port IDs as denoted by the element 551b of FIG. 9B are allocated for use with the volume or LUN A 503b when the systems are as described above in connection with FIG. 9A.

In at least one embodiment in accordance with the SCSI standard with reference to the FIGS. 10A-B, a command such as the RTPG or inquiry command, may be sent to either DS 1 500a or DS 3 700a requesting that the particular data storage system receiving the command report information regarding an exposed volume or LUN. In connection with the arrangement of FIG. 10A, such a command may be sent from the host 530 to the DS2 500b, such as over one of the paths belonging to 532g-h, or sent from the host 530a to the DS 3 700a, such as over one of the paths belonging to 532i-j, to request information regarding the "LUN A". In this example, the host recognizes the volumes 503b, 703a as the same configured stretched volume or LUN, "LUN A". Both the DS3 700a and the DS2 500b return the same set of information regarding the particular paths, target ports and TPGs over which the LUN A (the stretched LUN A configured using volumes 503b and 700a) is exposed to the host 530. In this case regarding the stretched LUN A, the DS3 700a and the DS2 500b return information as discussed above in connection with FIG. 10B. Management software of the DS 3 700a and the DS 2 500b may communicate with one another to coordinate by exchanging and storing information as discussed herein regarding the stretched volume or LUN A to ensure that both such systems report the same information about the stretched volume or LUN A configured from the volumes 703a and 503b. Information may be stored in a management DBs of the systems 700a and 500b indicating that the TPG IDs and target port IDs as denoted by the elements 751a-b of FIG. 10B are allocated for use with the stretched LUN A (configured as volumes 700a and 503b) when the systems are as described above in connection with FIG. 10A.

One important aspect to note is that the extended TPG IDs and extended target port IDs exposing a volume or LUN are dynamically assigned and bound, respectively, to TPGs and target ports. As discussed above such as in connection with FIGS. 8A and 8B, the extended IDs are determined and bound to TPGs and target ports for an exposed LUN or volume at the time the exposed LUN or volume is stretched using the stretch command or operation. In a similar manner, a determination to use the original normal IDs for TPGs and target ports for an exposed LUN or volume is made at the time the exposed LUN or volume is stretched or restretched, such as described in connection with FIGS. 10A and 10B. Thus more generally, the TPG IDs and target port IDs used for an exposed LUN or volume are determined at the time the exposed LUN or volume is stretched using the stretch command or operation.

Described in connection with the examples of FIGS. 8A-8B and FIGS. 10A-10B are examples in which the metro cluster configuration for a stretched volume or LUN spans across 2 data storage systems. More generally as discussed in connection with FIG. 7C, a stretched volume or LUN may span across M data storage systems, where M is equal to or greater than two. In such an arrangement, each of the M systems may include a volume or LUN instance configured with the same identity so that when all M volumes or LUNs across all M systems are exposed to a host, all such M volume or LUNs are recognized by the host as the same volume or LUN. As also discussed elsewhere herein, each target port ID and each TPG ID may be a size such as 16 bits where a number of the 16 bits are reserved for use in defining extended ID ranges. For example, the upper or 4 most significant bits may be reserved for use in defining extended ID ranges. In this case, data storage systems may be configured and initialized to have a base set of IDs that are normal IDs in the normal ID range. The normal ID range may be the range of ID values excluding the reserved 4 bits, such as in the range 1 through $2^{12}-1$. The upper 4 most significant bits that are reserved provide for using 0x for values in the normal range and selecting any value in the range of possible values from 1x to Fx when converting or mapping a normal ID to an extended ID in the extended range. In this case, M, may be constrained to be in the inclusive range of integers from 2 to 16. Each time a first volume or LUN in a first system is stretched to a second remote data storage system where a second volume or LUN in the second system is configured with the same identity as the first volume or LUN, the techniques herein may select an extended value as one of the possible values for the reserved bits. The reserved bits may be set to the extended value for TPG IDs and target port IDs of the second system exposing the second volume or LUN. In this manner, extended IDs for TPGs and target port IDs may be defined as the original or initially configured ID with the reserved bits set to the selected extended value. For example, the extended ID for a TPG may be determined as a logical OR of the original or initially configured ID (e.g., such as included in the Table 1 or Table 2) with the selected extended value, such as Fx. If the stretch operation is applied in connection with a volume or LUN spanning more than 2 data storage systems, another different one of the extended values for the reserved bits may be selected. In this manner, each time a stretched volume or LUN is stretched to a new volume in a new remote data storage system, the extended value selected may be used in connection with forming and mapping extended IDs for target ports and TPGs of the new data storage system exposing the new volume.

To further illustrate, the possible values for the 4 bits reserved range in connection with forming extended IDs range from 1x through Fx as noted above. In at least one embodiment, when stretching a first volume from a first data storage system to a second data storage system such as in FIG. 8A may use Fx as the extended value when mapping extended IDs to TPGs and target ports of the second data storage system exposing the second volume to a host. Now suppose the second volume is further stretched to a third volume of a third data storage system, such as described in connection with FIG. 7C. In this case, a different one of the possible extended values in the range from 1x through Fx is selected as the extended value when mapping extended IDs to TPGs and target ports of the third data storage system exposing the third volume to a host. For example, the value Ex (e.g., hexadecimal for fourteen) may be used when mapping extended IDs for target ports and TPGs of the third system exposing the third volume. If yet one of the first, second and third volumes is now further stretched to a fourth volume in a fourth data storage system, a different one of the possible extended values in the range from 1x through Fx is selected as the extended value when mapping extended IDs to TPGs and target ports of the fourth system exposing the fourth volume to a host. For example, the value Dx (e.g., hexadecimal for thirteen) may be used when mapping extended IDs for target ports and TPGs of the fourth system exposing the fourth volume. In a similar manner, for each new stretched volume added in a remote counterpart data storage system, extended IDs for target ports and TPG IDs may be mapped using a selected one of the possible extended values of the reserved 4 bits. The selected extended value for the newly added volume of the stretched volume or LUN configuration may be any one of the possible values that is not currently in use in connection with another volume of the stretched volume or LUN configuration. For example, with reference back to FIG. 7C, when selecting the extended value to use in connection with adding volume 425c of the DS 3 490 to the stretched volume configuration, the selected extended value cannot be Fx since Fx is already used in connection with forming unique extended IDs for target ports and TPGs exposing the volume 425b of the DS2 430.

In this manner, an embodiment in accordance with the techniques herein may provide for algorithmically assigning a unique extended value for use in connection with mapping extended IDs for target ports and TPGs that expose different volume instances configured as the same volume in a stretched volume or LUN configuration. The extended value may selected and assigned dynamically at the time an existing LUN or volume is stretched to include another volume or LUN in a remote system using the stretch command or operation.

Figure 11B:
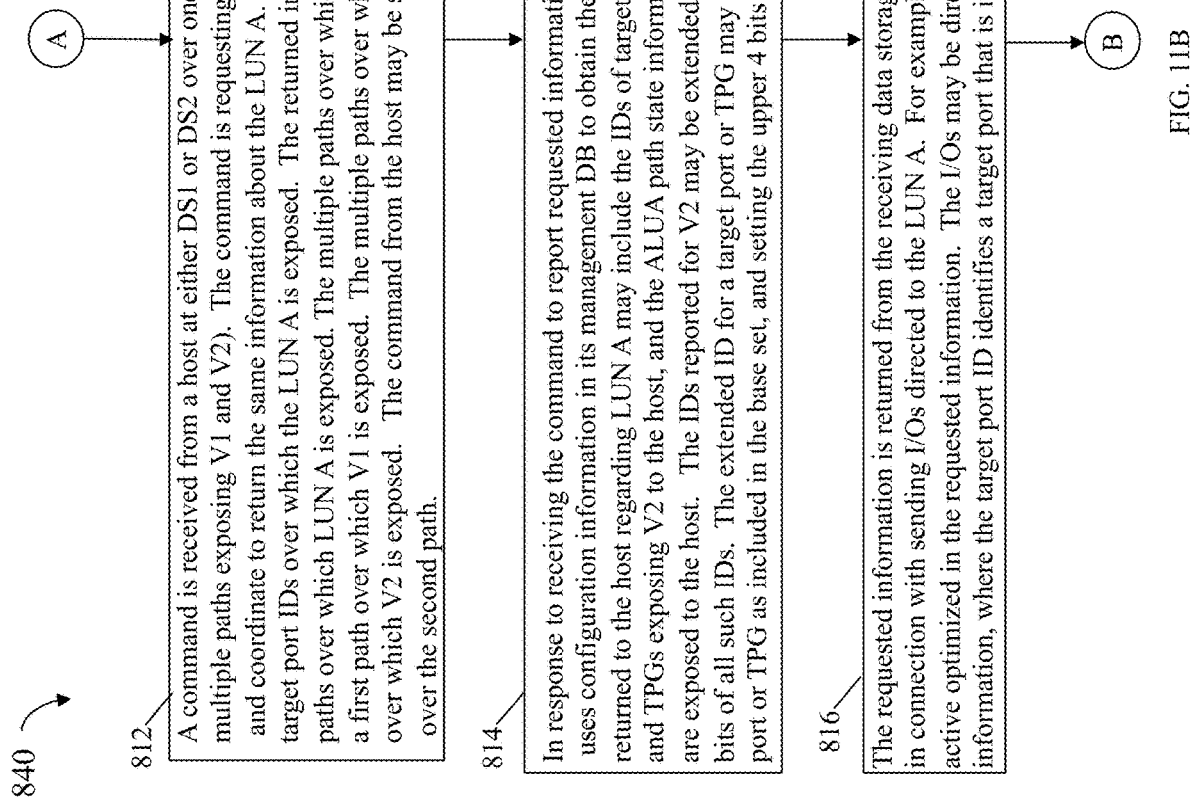

What will now be described in connection with FIGS. 11A-C are flowcharts of processing steps that may be performed in an embodiment in accordance with the techniques herein. In particular, the processing of FIGS. 11A-C summarize processing described above in connection with stretching the LUN A, unstretching the LUN A, and then restretching the LUN A.

In a step 802, processing is performed to initialize and configure the first data storage system DS1 and the second data storage system DS 2. The target ports and TPGs of the DS1 and the DS2 may be independently configured and initialized with IDs in the normal range. The target port IDs and TPG IDs used in DS1 may be stored in the management DB1 of DS1. The target port IDs and TPG IDs used in DS2 may be stored in the management DB2 of DS2. From the step 802, control proceeds to a step 804.

At the step 804, processing is performed to form a metro cluster configuration including both the DS1 and the DS2. Such processing may include exchanging information between the two systems. The information exchanged may include the particular target port IDs and TPG IDs assigned, respectively, to target ports and TPGs of DS1 and DS2. As a result of the information exchanged, the management DB1 of DS1 may include information as in Table 1 regarding the IDs assigned to target ports and TPGs of both DS1 and DS2. In a similar manner, the management DB2 of DS2 may also include the same information as in Table 1 regarding the IDs assigned to target ports and TPGs of both DS1 and DS2. The base set may denote the collective set of IDs assigned to the target ports and TPGs of both DS1 and DS2 based on the initial configuration of DS1 and D2 from the step 802. The management DB1 of DS1 and the management DB2 of DS2 both include a copy of the same base set. From the step 804, control proceeds to a step 806.

At the step 806, a first volume or LUN, V1, is configured on DS1 and exposed to the host as "LUN A". V1 has the attributes of unstretched and normal. The management DB1 of DS1 is accordingly updated. From the step 806, control proceeds to a step 808.

At the step 808, a stretch operation is performed to stretch V1 to a second volume or LUN, V2, on DS2. The volumes V1 and V2 are both configured and exposed to the host as the same volume or LUN, LUN A. The stretch operation processing includes setting the attributes of V1 to stretched and normal (e.g., this is unchanged). The stretch operation processing includes setting the attributes of V2 to stretched and extended. An extended value, such as Fx, is selected for use with V2 when forming extended IDs for the target ports and the TPGs of DS2 exposing V2. The stretch operation processing also includes determining ALUA path state information for the paths over which V1 and V2 are exposed to the host. The ALUA path state information for the paths over which V1 and V2 are exposed may be determined automatically by data storage systems such as by DS1 and DS2. The ALUA path state information may be determined, for example, as in the table 554a of FIG. 8B based on which of the volumes V1 and V2 and which of the system DS1 and DS2 are local or remote with respect to the host. From the step 808, control proceeds to the step 810.

At the step 810, the management DB1 on DS1 is updated to include the information on the stretched LUN A configuration including V1 and V2 and denoting the particular extended value, such as Fx, to be used in forming extended target ports and TPGs of DS2 exposing V2. In a similar manner, the management DB2 on DS2 is updated to include the information on the stretched LUN A configuration including V1and V2 and denoting the particular extended value, such as Fx, to be used in forming extended target ports and TPGs of DS2 exposing V2. The information stored in DB1 and DB2 may denote, for example, that V1 and V2 are configured as the same LUN A, V1 has the attributes of stretched and normal, and V2 has the attributes of stretched and extended using the extended value Fx to form extended IDs. The information stored in DB1 and DB2 may also include the ALUA path state information for paths over which V1 and V2 (e.g., LUN A) are exposed to the host. From the step 810 control proceeds to the step 812.

At the step 812, a command is received from a host at either DS1 or DS2 over one of the multiple paths exposing the stretched LUN A (e.g., the multiple paths exposing V1 and V2). The command is requesting information regarding the LUN A. Both DS1 and DS2 cooperate and coordinate to return the same information about the LUN A. In particular, the returned information includes the TPG IDs and target port IDs over which the LUN A is exposed. The returned information may also include ALUA path state information for those paths over which LUN A is exposed. The multiple paths over which the stretched LUN A is exposed may include a first path over which V1 is exposed. The multiple paths over which the stretched LUN A is exposed may include a second path over which V2 is exposed. The command from the host may be sent, for example, to DS1 over the first path or sent to DS2 over the second path. From the step 812, control proceeds to a step 814.

At the step 814, in response to receiving the command to report requested information regarding LUN A to the host, the receiving data storage system uses configuration information in its management DB to obtain the requested information regarding LUN A. The information returned to the host regarding LUN A may include the IDs of target ports and TPGs exposing V1 to the host, the IDs of target ports and TPGs exposing V2 to the host, and the ALUA path state information associated with paths over which V1 and V2 (e.g., LUN A) are exposed to the host. The IDs reported for V2 may be extended IDs formed using the selected extended value "Fx" in the reserved bits of all such IDs. The extended ID for a target port or TPG may be formed setting the first 12 bits to the original normal ID of the target port or TPG as included in the base set, and setting the upper 4 bits or reserved bits to the selected extended value "Fx". From the step 814, control proceeds to a step 816.

At the step 816, the requested information is returned from the receiving data storage system to the host. The host may use the requested information reported in connection with sending I/Os directed to the LUN A. For example, the host may send I/Os to LUN A on a path indicated as active optimized in the requested information. The I/Os may be directed to a particular target port ID included in the requested information, where the target port ID identifies a target port that is included in active optimized path from the host to either DS1 or D2. From the step 816, control proceeds to a step 818.

At the step 818, processing is performed to unstretch the LUN A by removing V1 and leaving V2 configured as LUN A. The unstretch operation may include updating attributes of V2 to be unstreteched and extended (e.g., this attribute is unchanged). Processing in the step 818 may include updating the management DB1 and DB2, respectively, for DS1 and DS2 based on the unstretch operation. From the step 818, control proceeds to the step 820.

At the step 820, processing is performed to retstretch LUN A from V2 on DS2 to a new volume instance V3 on a third data storage system DS3. The restretching may be accomplished using the stretch operation applied to V2 to stretch and extend the LUN A to include V3. As a result of the stretch operation, V2 and V3 are both configured and exposed to the host as the same volume or LUN A. The stretch operation processing includes setting the attributes of V2 to stretched and extended (e.g., this is unchanged). The stretch operation processing includes setting the attributes of V3 to stretched and normal. The selected extended value, such as Fx, is selected for use with V2 when forming extended IDs for target ports and TPGs of DS2 exposing V2. The stretch operation processing also includes determining ALUA path state information for paths over which V2 and V3 are exposed to the host. From the step 820, control proceeds to a step 822.

At the step 822, the management DB2 on DS2 is updated to include the information on the stretched LUN A configuration including V2 and V3 and denoting the particular extended value, such as Fx, to be used in forming extended target ports and TPGs of DS2 exposing V2. The management DB3 on DS3 is updated to include the information on the stretched LUN A configuration including V3 and V2 and denoting the particular extended value, such as Fx, to be used in forming extended target ports and TPGs of DS2 exposing V2. The information stored in DB3 and DB2 may denote, for example, that the V3 and V2 are configured as the same LUN A, V3 has the attributes of stretched and normal, and V2 has the attributes of stretched and extended using the extended value Fx to form extended IDs. The information stored in DB3 and DB2 may also include the ALUA path state information for paths over which V3 and V2 (e.g., LUN A) are exposed to the host. The ALUA path state information may be determined, for example, as in the table 750 of FIG. 10B based on which of the volumes V3 and V2 and which of the systems DS3 and DS2 are local or remote with respect to the host.

Although not explicitly included in the flowcharts of FIGS. 11A-C but described elsewhere herein, DS1 and/or DS2 may notify the host regarding the any changes in ALUA path state information such as, for example, with respect to the stretched LUN A in connection with the steps 808 and 822. In this manner, the host may use the updated ALUA path state information to preferably select active optimized paths for use in connection with sending I/Os to the LUN A.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of exposing volumes to hosts comprising:
    configuring a first data storage system, DS1, with a first identifier set of target port identifiers and target port group identifiers;
    configuring a second data storage system, DS2, with a second identifier set of target port identifiers and target port group identifiers;
    performing a stretch operation to configure a stretched volume using a first volume, V1, on DS1 and a second volume V2 on a second data storage system, DS2, wherein V1 and V2 are configured as a same logical volume, L1, and exposed to the host as the same logical volume, L1, over a plurality of paths including a first path, P1, and a second path, P2, wherein P1 is between the host and DS1, and wherein P2 is between the host and DS2, wherein V1 has a normal attribute indicating that target ports and target port groups of DS1 have associated identifiers as specified in the first identifier set when reporting information regarding L1 to the host, wherein V2 has an extended attribute indicating that target ports and target port groups of DS2 have associated extended identifiers determined using the second identifier set and a first extended value when reporting information regarding L1 to the host; and
    reporting first information to the host regarding L1, wherein the first information comprises a third identifier set including target port identifiers and target port group identifiers of the first identifier set over which V1 is exposed to the host, wherein the first information comprises a fourth identifier set including extended target port identifiers and extended target port group identifiers over which V2 is exposed to the host, wherein each of the extended target port identifiers and each of the extended target port group identifiers includes a first portion of bits having a first value based on a corresponding identifier from the second identifier set and includes a second portion of reserved bits having a second value equal to the first extended value.

2. The method of claim 1, wherein each of the target port identifiers in the first identifier set, the second identifier set and the third identifier set are included in a normal identifier range of values, and each of the target port group identifiers of the first identifier set, the second identifier set and the third identifier set are included in a normal identifier range of values.

3. The method of claim 2, wherein each of the extended target port identifiers of the fourth identifier set and each of the extended target port group identifiers of the fourth identifier set are included in an extended identifier range of values that does not overlap with the normal identifier range of values.

4. The method of claim 3, further comprising:
    issuing, from the host to one of DS1 and DS2, a command requesting the first information regarding L1, wherein the command is issued on one of the plurality of paths over which L1 is exposed to the host, and wherein said reporting first information to the host regarding L1 is performed in response to receiving the command from the host.

5. The method of claim 4, wherein the first identifier set and the second identifier set each include a same first target port identifier and each include a same first target port group identifier.

6. The method of claim 5, wherein each target port identifier of the third identifier set is unique with respect to all target port identifiers of the third identifier set and the fourth identifier set, and wherein each target port identifier of the fourth identifier set is unique with respect to all target port identifiers of the third identifier set and the fourth identifier set.

7. The method of claim 6, wherein each target port group identifier of the third identifier set is unique with respect to all target port group identifiers of the third identifier set and the fourth identifier set, and wherein each target port group identifier of the fourth identifier set is unique with respect to all target port group identifiers of the third identifier set and the fourth identifier set.

8. The method of claim 1, wherein the first information includes access path state information for each path over L1 is exposed to the host, wherein the access path state information indicates that P1 is active optimized for L1, and P2 is active non-optimized for L1.

9. The method of claim 8, wherein the method further comprises:
    selecting, by the host, a particular path over which to send an I/O operation directed to L1, wherein said selecting selects P1 as the particular path rather than P2 since P1 is active optimized and P2 is active non-optimized; and
    sending the I/O operation directed to L1 over the first path from the host to DS1.

10. The method of claim 1, wherein V1 and V2 are configured for synchronous replication of writes from V1 to V2, and synchronous replication of writes from V2 to V1.

11. The method of claim 1, further comprising:
    performing an unstretch operation to unstretch L1, wherein unstretching L1 includes deleting V1 from DS1 and setting attributes of V2 to indicate that V2 is unstretched.

12. The method of claim 11, wherein a third data storage system, DS3, is configured with a fifth identifier set of target port identifiers and target port group identifiers.

13. The method of claim 12, further comprising:
performing a second stretch operation to configure a stretched volume using V2 on DS2 and a third volume, V3, on DS3, wherein V3 and V2 are configured as the same logical volume, L1, and exposed to the host as the same logical volume, L1, over a plurality of paths including P2 and a third path, P3, wherein P3 is between the host and DS3, and wherein V3 has the normal attribute indicating that target ports and target port groups of DS3 have associated identifiers as specified in the fifth identifier set when reporting information regarding L1 to the host, wherein V2 has the extended attribute indicating that target ports and target port groups of DS2 have associated extended identifiers determined using the second identifier set and the first extended value when reporting information regarding L1 to the host; and
reporting second information to the host regarding L1, wherein the second information comprises a sixth identifier set including target port identifiers and target port group identifiers of the fifth identifier set over which V3 is exposed to the host, wherein the second information comprises the fourth identifier set including extended target port identifiers and extended target port group identifiers over which V2 is exposed to the host.

14. A system comprising:
one or more processors; and
one or more memories comprising code stored thereon that, when executed, performs a method of exposing volumes to hosts comprising:
configuring a first data storage system, DS1, with a first identifier set of target port identifiers and target port group identifiers;
configuring a second data storage system, DS2, with a second identifier set of target port identifiers and target port group identifiers;
performing a stretch operation to configure a stretched volume using a first volume, V1, on DS1 and a second volume V2 on a second data storage system, DS2, wherein V1 and V2 are configured as a same logical volume, L1, and exposed to the host as the same logical volume, L1, over a plurality of paths including a first path, P1, and a second path, P2, wherein P1 is between the host and DS1, and wherein P2 is between the host and DS2, wherein V1 has a normal attribute indicating that target ports and target port groups of DS1 have associated identifiers as specified in the first identifier set when reporting information regarding L1 to the host, wherein V2 has an extended attribute indicating that target ports and target port groups of DS2 have associated extended identifiers determined using the second identifier set and a first extended value when reporting information regarding L1 to the host; and
reporting first information to the host regarding L1, wherein the first information comprises a third identifier set including target port identifiers and target port group identifiers of the first identifier set over which V1 is exposed to the host, wherein the first information comprises a fourth identifier set including extended target port identifiers and extended target port group identifiers over which V2 is exposed to the host, wherein each of the extended target port identifiers and each of the extended target port group identifiers includes a first portion of bits having a first value based on a corresponding identifier from the second identifier set and includes a second portion of reserved bits having a second value equal to the first extended value.

15. A non-transitory computer readable medium comprising code stored thereon that, when executed, performs a method of exposing volumes to hosts comprising:
configuring a first data storage system, DS1, with a first identifier set of target port identifiers and target port group identifiers;
configuring a second data storage system, DS2, with a second identifier set of target port identifiers and target port group identifiers;
performing a stretch operation to configure a stretched volume using a first volume, V1, on DS1 and a second volume V2 on a second data storage system, DS2, wherein V1 and V2 are configured as a same logical volume, L1, and exposed to the host as the same logical volume, L1, over a plurality of paths including a first path, P1, and a second path, P2, wherein P1 is between the host and DS1, and wherein P2 is between the host and DS2, wherein V1 has a normal attribute indicating that target ports and target port groups of DS1 have associated identifiers as specified in the first identifier set when reporting information regarding L1 to the host, wherein V2 has an extended attribute indicating that target ports and target port groups of DS2 have associated extended identifiers determined using the second identifier set and a first extended value when reporting information regarding L1 to the host; and
reporting first information to the host regarding L1, wherein the first information comprises a third identifier set including target port identifiers and target port group identifiers of the first identifier set over which V1 is exposed to the host, wherein the first information comprises a fourth identifier set including extended target port identifiers and extended target port group identifiers over which V2 is exposed to the host, wherein each of the extended target port identifiers and each of the extended target port group identifiers includes a first portion of bits having a first value based on a corresponding identifier from the second identifier set and includes a second portion of reserved bits having a second value equal to the first extended value.

16. The non-transitory computer readable medium of claim 15, wherein each of the target port identifiers in the first identifier set, the second identifier set and the third identifier set are included in a normal identifier range of values, and each of the target port group identifiers of the first identifier set, the second identifier set and the third identifier set are included in a normal identifier range of values.

17. The non-transitory computer readable medium of claim 16, wherein each of the extended target port identifiers of the fourth identifier set and each of the extended target port group identifiers of the fourth identifier set are included in an extended identifier range of values that does not overlap with the normal identifier range of values.

18. The non-transitory computer readable medium of claim 17, further comprising:
issuing, from the host to one of DS1 and DS2, a command requesting the first information regarding L1, wherein the command is issued on one of the plurality of paths over which L1 is exposed to the host, and wherein said reporting first information to the host regarding L1 is performed in response to receiving the command from the host.

19. The non-transitory computer readable medium of claim 18, wherein each target port identifier of the third identifier set is unique with respect to all target port identifiers of the third identifier set and the fourth identifier set; and wherein each target port group identifier of the third identifier set is unique with respect to all target port group identifiers of the third identifier set and the fourth identifier set.

20. The non-transitory computer readable medium of claim 15, wherein the first information includes access path state information for each path over L1 is exposed to the host, wherein the access path state information indicates that P1 is active optimized for L1, and P2 is active non-optimized for L1, and wherein the method further comprises:
 selecting, by the host, a particular path over which to send an I/O operation directed to L1, wherein said selecting selects P1 as the particular path rather than P2 since P1 is active optimized and P2 is active non-optimized; and
 sending the I/O operation directed to L1 over the first path from the host to DS1.

* * * * *